US008943371B2

(12) United States Patent

Russo et al.

(10) Patent No.: US 8,943,371 B2

(45) Date of Patent: Jan. 27, 2015

(54) METHODS AND SYSTEMS FOR COMPUTER-AIDED IDENTIFICATION OF TECHNICAL PHENOMENA

(75) Inventors: Davide Russo, Florence (IT); Valentino Birolini, Albino (IT)

(73) Assignee: Bigflo SRL, Dalmine (BG) (IT)

( * ) Notice: Subject to any disclaimer, the term of this patent is extended or adjusted under 35 U.S.C. 154(b) by 711 days.

(21) Appl. No.: 13/212,985

(22) Filed: Aug. 18, 2011

(65) Prior Publication Data

US 2012/0054559 A1 Mar. 1, 2012

(30) Foreign Application Priority Data

Aug. 24, 2010 (IT) .............................. GE2010A0093

(51) Int. Cl.

*G06F 11/00* (2006.01)
*G06N 5/02* (2006.01)
*G06N 5/04* (2006.01)

(52) U.S. Cl.

CPC . *G06N 5/022* (2013.01); *G06N 5/04* (2013.01)
USPC .............. 714/46; 715/700; 715/764; 715/781

(58) Field of Classification Search

CPC . G06F 11/0793; G06F 11/327; G06F 9/4446; G06F 3/048; G06F 8/34; G06F 11/079; G06F 3/0482; G06F 11/2257; G06F 17/2881; H04L 41/22
USPC ............................. 714/46; 715/700, 764, 781
See application file for complete search history.

(56) References Cited

U.S. PATENT DOCUMENTS

| | | | | |
|---|---|---|---|---|
| 5,581,663 | A | 12/1996 | Zlotin et al. | |
| 5,878,302 | A * | 3/1999 | Inui et al. | 399/81 |
| 6,056,428 | A | 5/2000 | Devoino et al. | |
| 7,454,391 | B2 | 11/2008 | Zhang | |
| 8,270,986 | B1 * | 9/2012 | Nucci et al. | 455/450 |
| 8,484,693 | B2 * | 7/2013 | Cox et al. | 726/1 |
| 8,539,438 | B2 * | 9/2013 | Bassin et al. | 717/101 |
| 8,543,933 | B2 * | 9/2013 | Jung | 715/766 |
| 8,628,331 | B1 * | 1/2014 | Wright | 434/236 |
| 8,819,585 | B2 * | 8/2014 | Sareen et al. | 715/804 |

(Continued)

FOREIGN PATENT DOCUMENTS

| | | |
|---|---|---|
| WO | 99/18527 | 4/1999 |
| WO | 2005/055000 | 6/2005 |

OTHER PUBLICATIONS

EPO Search Report for Italian Application GE2010A000093 filed on Aug. 24, 2011 in the name of Davide Russo et al.

*Primary Examiner* — Loan L. T. Truong

(74) *Attorney, Agent, or Firm* — Steinfl & Bruno LLP

(57) ABSTRACT

A system for computer-aided identification of technical phenomena and related methods, particularly with technical problems is described. The system is equipped with a computer executing a program and provided with means for inputting alphanumeric data, means for entering graphical information, and a visual display. The execution of said program causes the computer to work by displaying a sequence of request and input windows for a description of the technical phenomenon by way of an alphanumeric, human natural language and/or a graphical image and according to specific logic and construction rules of the human natural language expression or of the graphic expression, at a detailed level, which construction rules change from window to window and are displayed at the margin of a data input field in the window.

12 Claims, 22 Drawing Sheets

(56) References Cited

U.S. PATENT DOCUMENTS

2006/0184294 A1* 8/2006 Ma et al. ........................ 701/25
2006/0224992 A1* 10/2006 Rossi et al. .................. 715/781
2007/0079251 A1* 4/2007 Peterkofsky et al. ......... 715/781
2008/0082937 A1* 4/2008 Bennah et al. ................ 715/781
2008/0183886 A1* 7/2008 Cheung ........................ 709/231
2008/0271111 A1* 10/2008 Cox et al. ......................... 726/1
2010/0180163 A1* 7/2010 Douady et al. .................. 714/57
2010/0251168 A1* 9/2010 Fujita et al. .................. 715/790
2010/0293413 A1* 11/2010 Borjon ............................ 714/35
2010/0306645 A1* 12/2010 Roulland et al. .............. 715/271
2010/0330972 A1* 12/2010 Angiolillo ..................... 455/418
2011/0028203 A1* 2/2011 Agarwal et al. ................. 463/20
2011/0047501 A1* 2/2011 Mohler ......................... 715/781
2011/0231711 A1* 9/2011 Kanno et al. .................... 714/49

* cited by examiner

Fig. 8

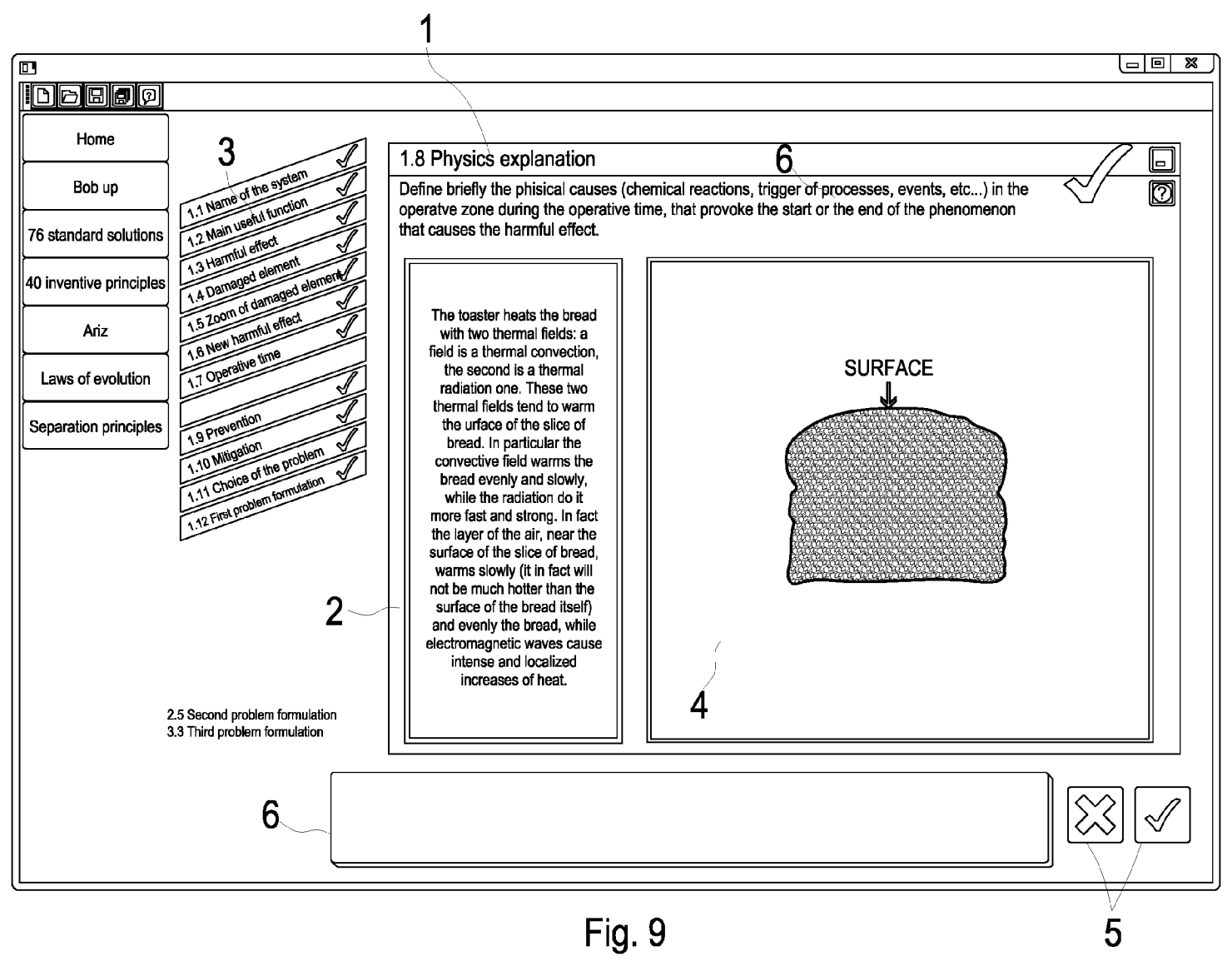

Home
Bob up
76 standard solutions
40 inventive principles
Ariz
Laws of evolution
Separation principles 1.1 Name of the system
1.2 Main useful function
1.3 Harmful effect
1.4 Damaged element
1.5 Zoom of damaged element
1.6 New harmful effect
1.7 Operative time
1.9 Prevention
1.10 Mitigation
1.11 Choice of the problem
1.12 First problem formulation 2.5 Second problem formulation
3.3 Third problem formulation 1.8 Physics explanation Define briefly the phisical causes (chemical reactions, trigger of processes, events, etc...) in the operatve zone during the operative time, that provoke the start or the end of the phenomenon that causes the harmful effect.

The toaster heats the bread with two thermal fields: a field is a thermal convection, the second is a thermal radiation one. These two thermal fields tend to warm the urface of the slice of bread. In particular the convective field warms the bread evenly and slowly, while the radiation do it more fast and strong. In fact the layer of the air, near the surface of the slice of bread, warms slowly (it in fact will not be much hotter than the surface of the bread itself) and evenly the bread, while electromagnetic waves cause intense and localized increases of heat.

SURFACE 1
2
3
4
5
6
6

Fig. 9

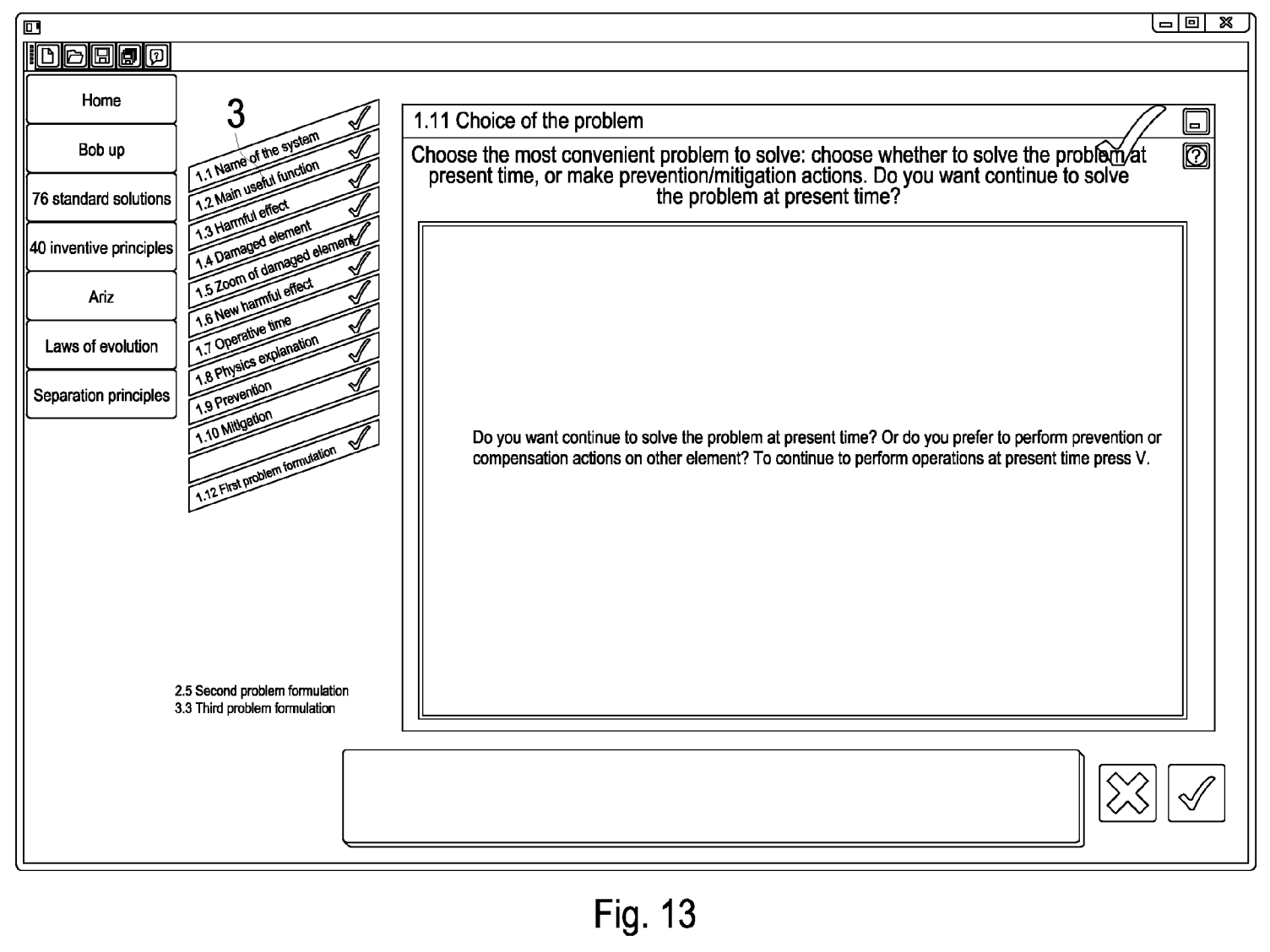

Home

Bob up 76 standard solutions 40 inventive principles

Ariz

Laws of evolution

Separation principles

3

1.1 Name of the system 1.2 Main useful function 1.3 Harmful effect 1.4 Damaged element 1.5 Zoom of damaged element 1.6 New harmful effect 1.7 Operative time 1.8 Physics explanation 1.9 Prevention 1.10 Mitigation 1.12 First problem formulation 2.5 Second problem formulation 3.3 Third problem formulation 1.11 Choice of the problem Choose the most convenient problem to solve: choose whether to solve the problem at present time, or make prevention/mitigation actions. Do you want continue to solve the problem at present time?

Do you want continue to solve the problem at present time? Or do you prefer to perform prevention or compensation actions on other element? To continue to perform operations at present time press V.

Fig. 13

Home
Bob up
76 standard solutions
40 inventive principles
Ariz
Laws of evolution
Separation principles 1.1 Name of the system
1.2 Main useful function
1.3 Harmful effect
1.4 Damaged element
1.5 Zoom of damaged element
1.6 New harmful effect
1.7 Operative time
1.8 Physics explanation
1.9 Prevention
1.10 Mitigation
1.11 Choice of the problem 1.12 First problem formulation Problem formulation step 1

This is the temperature that activates the harmful part of Maillard reaction, that is, its burning part.
Physics explanation:

the toaster heats the bread with two thermal fields: a field is a thermal convection, the second is a thermal radiation one. These two thermal fields tend to warm the surface of the slice of bread. In particular the convective field warm the bread evenly and slowly, while the radiation do it more fast and strong. In fact the layer of the air, near the surface of the slice of bread, warms slowly (it in fact will not be much hotter than the surface of the bread itself) and evenly the bread, while electromagnetic waves cause intense and localized increases of temperature due to energy waves that hit against the surface of bread. These increases cause localized burning of the bread. It is possible to conclude that the main contribution is given by the radiating radiation. The surface of the bread heats up more and more until it reaches 180°C temperature which is the start of the carbonization of the Maillard reaction. It is a chemical reaction that causes the first browning of the bread, and then the burning.

Prevention actions:
To prevent the harmful effect I should have chosen or made a more sesistant bread.
Mitigation actions:
the problem remains unsolved the consequence is that it is necessary to remove the bunt layer.

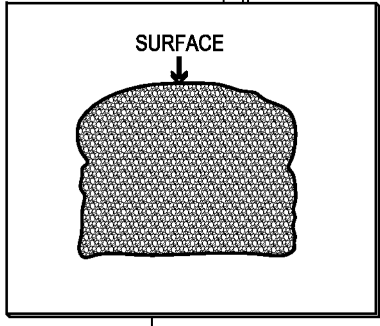

Fig. 14

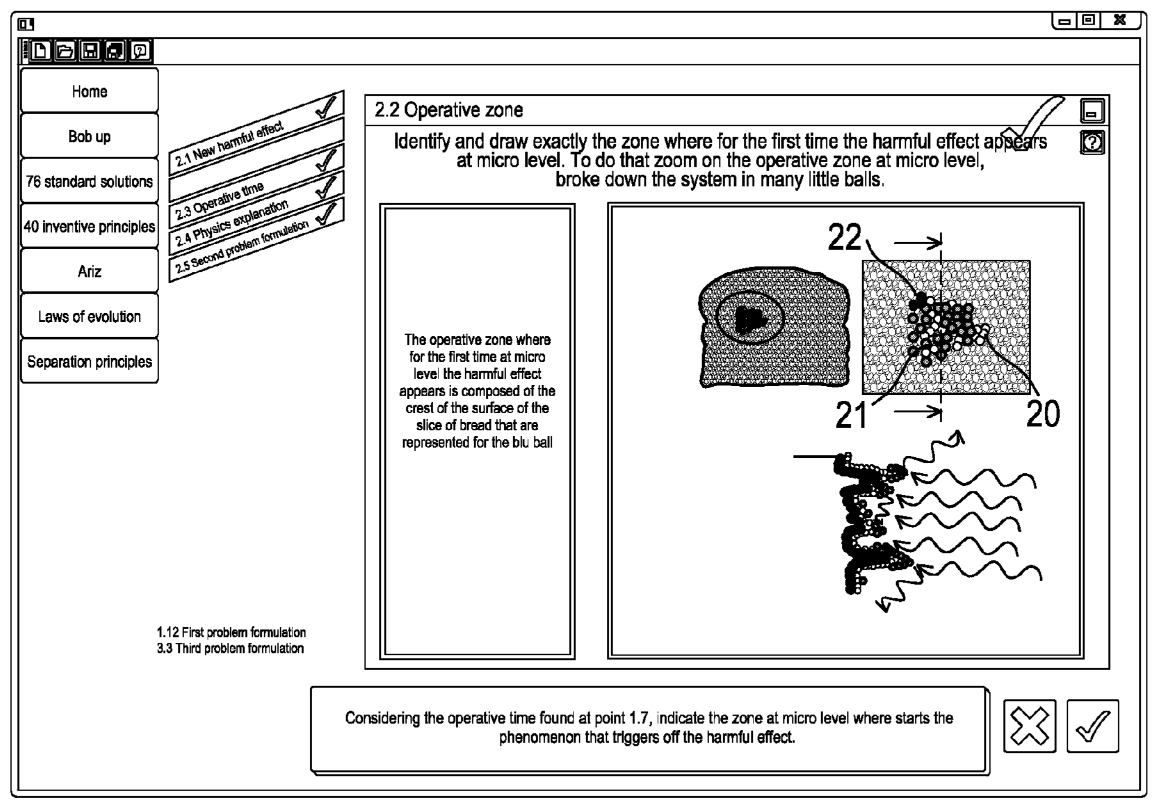
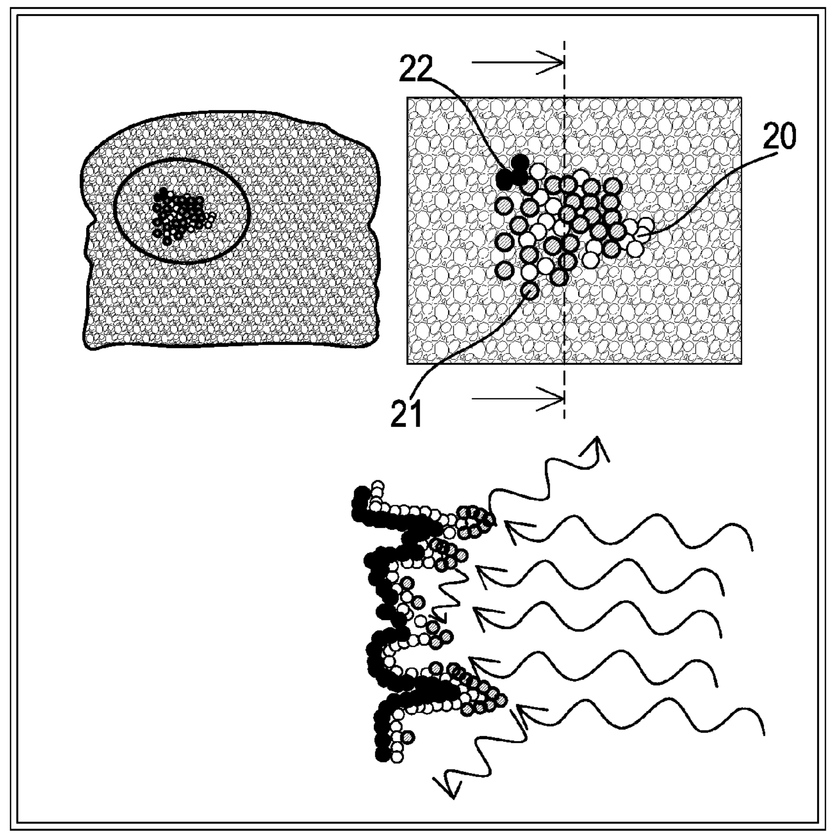
Fig. 16

Home
Bob up
76 standard solutions
40 inventive principles
Ariz
Laws of evolution
Separation principles 3.1 Find out the harmful effect
3.2 Operative zone of the harmful effect 3.3 Third problem formulation Problem formulation - step 3

Name of the system:
The system is a toaster
Element:
The element that causes the harmful effect is the electric resistance
Operative zone:
The zone of the harmful element that firstly provokes the harmful effect is the part of the surface of the resistance that looks at the part of the surface of the bread that is burnt.
Harmful effect:
the element slice of bread burns on a part of its surface.
Operative time:
the operative time is the moment when the crests of the surface of the slice of bread overcome 180°.

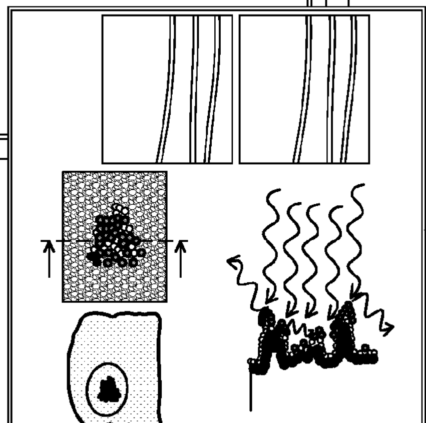

Fig. 22

METHODS AND SYSTEMS FOR COMPUTER-AIDED IDENTIFICATION OF TECHNICAL PHENOMENA

CROSS REFERENCE TO RELATED APPLICATIONS

The present application claims priority to Italian Patent Application No. GE2010A000093, filed on Aug. 24, 2010, which is incorporated herein by reference in its entirety.

FIELD

The present disclosure relates to computer programs and related methods. In particular, it relates to methods and systems for computer-aided identification of technical phenomena.

BACKGROUND

Since 1940 theories and systems for solving problems found in the evolution of engineered systems have been examined. A theory known as TRIZ has been described in [Altshuller G. S. (1984) Creativity as an exact science: the theory of the solution of inventive problems. CRC Press, ISBN 9780677212302] and may be considered as a part of the present disclosure. Technological problem solving systems and methods comprising several tools have been developed from this theory.

The operation of such tools is mainly based on the solution of contradictions and particularly contradictions occurring when an improvement of one or more characteristics of a system leads to the undesired worsening of one or more other characteristics.

Problem solving tools comprise standard solutions, principles for solving physical contradictions, principles for removing technological contradictions, information databases and algorithms for the solution of inventive problems particularly a class of algorithms called ARIZ. Such algorithm is described in detail in [U.S. Pat. No. 5,581,663].

Frequently in technological systems and particularly in complex technological systems a real problem to be solved is not always apparent. This main problem is often hidden by other side or secondary problems that are more apparent than the main problem. Therefore a problem formulation process that is not suitable for bringing the main problem out, but limited to identifying side problems leads to solutions to the technical problem whose technical effects do not modify the overall situation and therefore they do not lead to the desired results.

The Iwint system is described in [U.S. Pat. No. 7,454,391]. This system provides to build cause-effect trees related to an initial problem statement. The system allows undesirable effects to be added while the system provides to automatically generate alternative problem statements and queries for search in knowledge database.

Further examples are the so-called "Techoptimizer" and "Goldfire Innovator" which are described in documents [WO2005055000 and U.S. Pat. No. 6,056,428]

The Techoptimizer software allows a user to use a functional model of a design or technological process to perform value diagnostics of the design or technological process and to identify better configurations and what problems have to be solved in order to achieve the new configuration.

The Goldfire Innovator software comprises problem analysis tools, automatically formulating the problem statement into a natural language or Boolean query that is automatically submitted via a knowledge search tool to a database. Responses to the queries from the database are automatically provided.

Such methods have the common characteristic of being based on how a user perceives the problem.

Moreover, in the case of physically complex systems to be examined, most of the known models break down, namely they reach such a complexity level to lose readability and consequently efficacy.

SUMMARY

The present disclosure is based on satisfying requirements, by a system and a method, for computer-aided identification of technical phenomena allowing a technical problem affecting a system to be identified, defined and formulated such to address a main problem, preventing it from being hidden by secondary or apparent problems, at the proper level of detail and substantially independently from the skill and experience of the user.

By properly defining and by properly formulating the technical problem, it is possible to make the known automated technical problem solving systems efficient and also reliable from a functional point of view.

The present disclosure describes a system for computer-aided identification of technical phenomena, comprising: a computer executing a program and provided with an alphanumeric data input, a graphical information input, and a visual display.

According to a first aspect of the disclosure, a system for computer-aided identification of technical problems is described, comprising a computer adapted to execute a program, the computer comprising an alphanumeric data input, a graphical information input, and a visual display; wherein: the program, when executed, prompts the computer to display a sequence of windows which request input for a description of the technical problem, wherein: the input can be alphanumeric, human natural language and/or a graphical image, identification of the technical problem may be determined according to specific logic and construction rules of the human natural language expression or the graphic expression, and formulation rules may change from window to window and are displayed at the margin of a data input field in the window.

A method for computer-aided identification of technical phenomena is described, particularly for identifying and formulating technical problems comprising a plurality of alternative steps, to be executed by a computer, for aided formulation of the technical problem according to predetermined formulation rules and identification criteria different for each formulation step.

A method for computer-aided identification of technical problems is provided, the method comprising executing a computer program on a computer, the computer comprising: an alphanumeric data input, a graphical information input, and a visual display; wherein: the executing the program prompts the computer to display a sequence of windows which request input for a description of the technical problem, wherein: the input can be alphanumeric, human natural language and/or a graphical image, identification of the technical problem may be determined according to specific logic and construction rules of the human natural language expression or the graphic expression, formulation rules may change from window to window and are displayed at the margin of a data input field in the window.

The details of one or more embodiments of the disclosure are set forth in the accompanying drawings and the description below. Other features, objects, and advantages will be apparent from the description and drawings, and from the claims.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIGS. 8 and 9 depict embodiments of windows displayed on the monitor of a computer for executing a first extended formulation step.

FIGS. 13 and 14 show examples of a choice of technical problem formulation at an end of a first formulation stage.

FIGS. 15 and 16 show examples of formulation windows of a first formulation step of a second formulation stage.

FIGS. 17 and 18 show examples of formulation windows of a second extended formulation step of a second formulation stage.

FIGS. 20 to 22 show windows of a third formulation, FIG. 22 depicting a final window of a third formulation stage.

DETAILED DESCRIPTION

Figure 1:
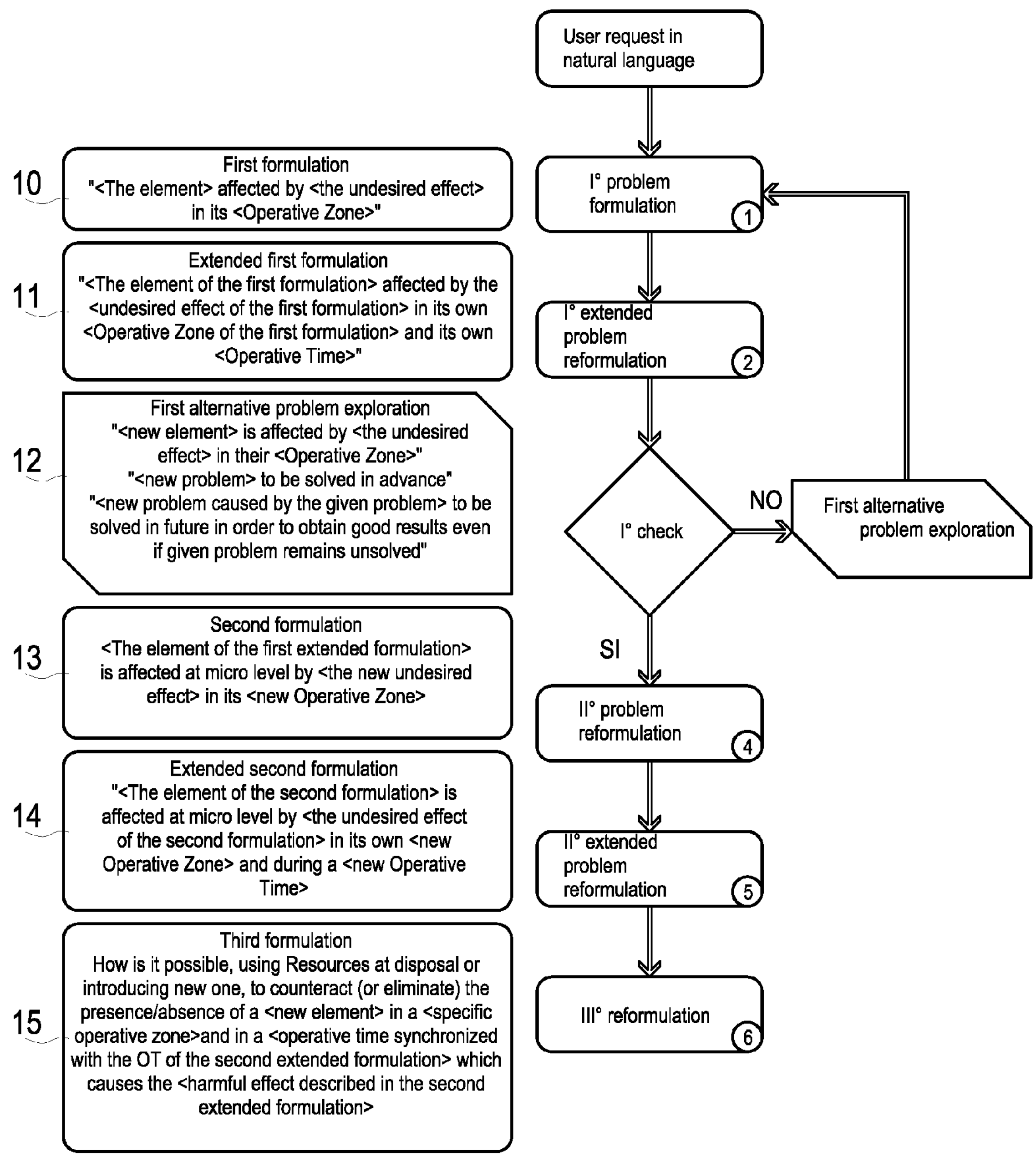
FIG. 1 shows a block functional diagram of a system according to the disclosure.
Figure 2:
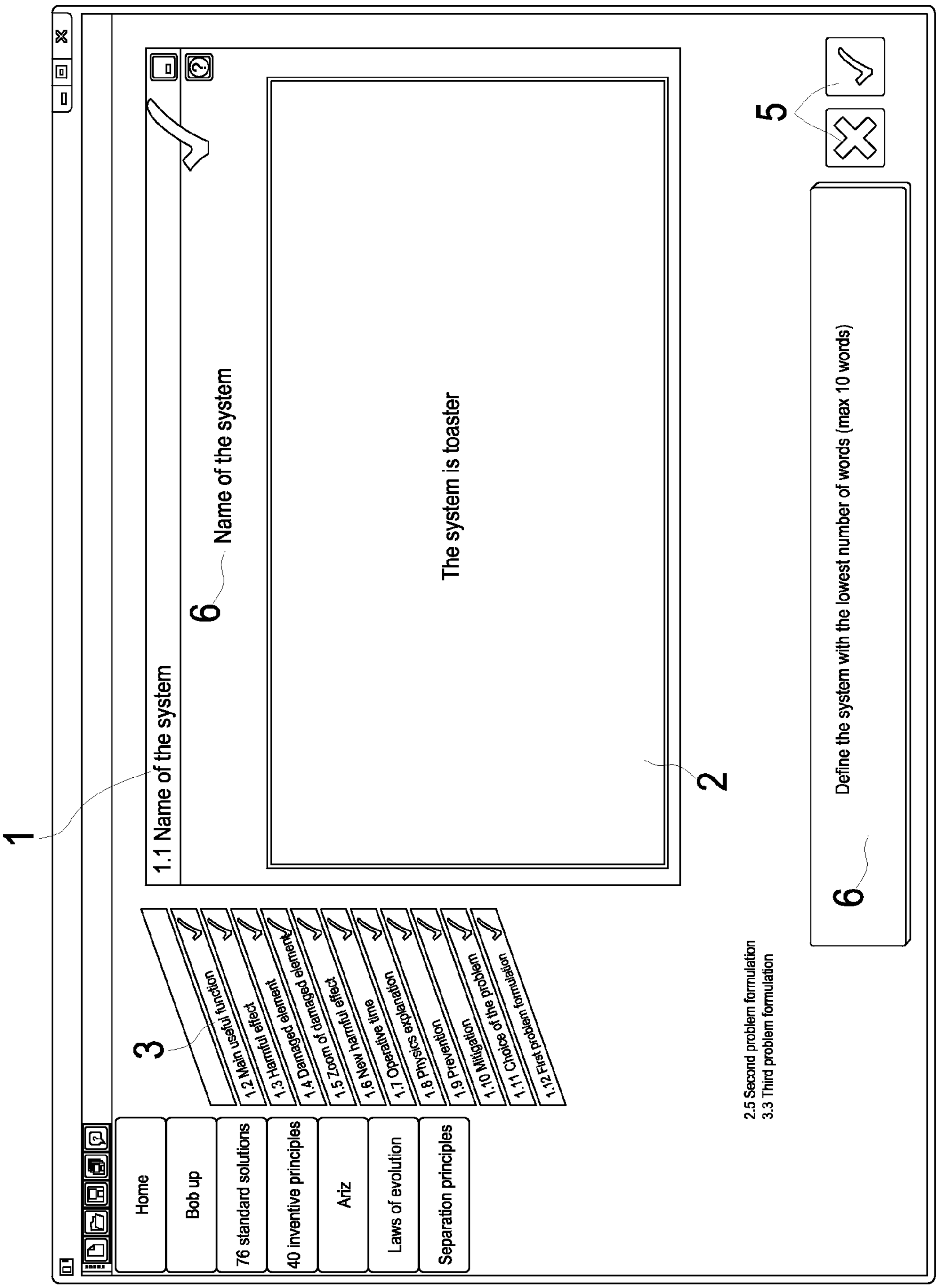
FIGS. 2 to 5 depict embodiments of windows displayed on the monitor of a computer for executing a first formulation step.

The present disclosure provides systems and methods for which a main problem occurring in a system can be identified and formulated/defined, free from prejudices and with a high level of detail, which may be achieved regardless of skill and experience of the user and can be achieved with physically complex systems.

Thus the present disclosure relates to a system and a method for the computer-aided identification of technical phenomena allowing a technical problem affecting a system to be identified, defined and formulated such to address the main problem preventing it from being hidden by secondary or apparent problems, at high level of detail and substantially independent from the skill and experience of the user.

By defining and formulating a technical problem, known automated technical problem solving systems can be made efficient and reliable.

Herein is described a system for computer-aided identification of technical phenomena, comprising: a computer executing a program and provided an alphanumeric data input, a graphical information input, and with a visual display; the execution of said program causing the computer to work by displaying a sequence of request and input windows for a description of the technical phenomenon by means of an alphanumeric, human natural language and/or a graphical image and according to specific logical and construction rules of the human natural language expression or of the graphic expression, as well as of the detailed level which rules change from window to window and are displayed at the margin of a data input field in said window.

In some embodiments a specific number of problem formulation steps are provided, one after the other in a sequence of problem formulation steps.

In some embodiments the formulation steps are grouped together in three formulation stages which are: a first stage for defining/formulating the problem at macro level and with reference to the element affected by an undesired effect, a second stage for formulating the problem at a higher detailed level, micro level, that is on a more enlarged scale still with reference to the micro element affected by or showing the undesired effect, and a third stage defining the element generating the undesired effect on the element affected by it and the effect or the action the undesired effect results from.

In each of three main problem formulation stages, the problem is expressed by a different problem formulation rule.

In some embodiments the system provides a first two problem formulation stages wherein the formulation rules force the user to define the space-time arrangement of an element of a technical system affected by an undesired effect and at least a further final formulation stage with formulation rules for generating chains of cause and effect for identifying the cause of the undesired effect.

In some embodiments a first formulation stage may be provided wherein the problem statement can be made by indicating: an element affected by the undesired effect; a type of undesired effect, and an operative zone, while a linguistic expression may be requested with a minimum of three words to a maximum of 5 words, without using adjectives or adverbs. The so-called operative zone refers to the zone of the element affected by the undesired effect, i.e. where the undesired effect takes place.

A second formulation stage, where the problem may again be expressed can be done so with an emphasis on the undesired element and/or on the operative zone and wherein the formulation again can take place by using definitions of element, undesired effect and operative zone.

A third formulation stage comprises formulating one or more hypotheses of actions for counteracting the occurrence of the undesired effect.

In some embodiments each the first, second and third formulation stage can have one or more intermediate formulation steps according to further different criteria or rules for formulating the technical problem.

The first formulation stage as described above can be followed by two further formulation steps. The two further formulation steps may include a first extended formulation, wherein an identification/formulation of the moment when an undesired effect starts or ends may be considered and an alternate formulation comprising exploring and/or speculating on a mechanism.

Therefore the first extended formulation step provides a problem to be formulated with a linguistic expression that provides a certain maximum number of words, usually not adverbs or adjectives, which may comprise the following elements: the element affected by the undesired effect; the type of undesired effect; the operative zone, i.e. the zone of the element affected by the undesired effect where said undesired effect takes place; in which the operative time may define the moment when the undesired effect starts or ends in the operative zone.

The first alternate problem exploration step my comprise identifying and formulating one or more technical problems to be solved before solving the main problem and which may take place in a time prior to the operative time and/or new technical problems which may result from a non-solution of the main technical problem and which take place in a time after the operative time defined for the main problem.

Such problems may be subjected to a check regarding their existence and may be compared with the main problem in order to verify the real problem to be solved. A choice may then be given between the main problem and the alternate problems with which it is possible to continue a problem statement process.

The first alternative formulation step relates to a problem formulation using elements or concepts such as: a new problem to be solved in a time prior to the operative time of the main problem, a new element affected by the undesired effect; an undesired effect; an operative zone, or a new problem resulting from the non-solution of the main problem and to be solved in a time after the operative time of the main problem to achieve relevant results, even if the main problem is not solved.

Once the main problem and the first formulation stage for this problem are defined, the second problem formulation stage can be performed which can comprise several individual steps as well.

In some embodiments, the second formulation stage may provide a first formulation step, wherein a problem formulation has a more detailed level than the first formulation stage and wherein a problem is defined by: an element determined in the first extended formulation; a new undesired effect affecting the element at micro level, an operative zone of the element at said micro level where the undesired effect takes place, and a second extended formulation step wherein the problem is defined by: the element determined by the second formulation; the undesired effect of the second formulation affecting said element and at micro level; an operative zone wherein said undesired effect of the second formulation takes place; and the operative time of the second formulation that relates to the undesired effect of the second formulation and to the operative zone of the second formulation.

The second formulation stage may pass to a third formulation stage wherein a technical problem can be formulated according to the following rules by defining a chain of cause and effect.

The formulation of the cause of the undesired effect and thus of the problem may be achieved by ascertaining how it is possible, using available resources or introducing new ones, to eliminate or counteract presence or absence of a new element in a specific operative zone and in an operative time synchronized with an operative time of a second extended formulation in which the operative time causes a harmful effect described in a second extended formulation.

According to the disclosure, a system and a method for computer-aided identification of technological phenomena can be provided, particularly technical problems that are not a mere compilation of forms, and may serve as a guide for an objective reasoning that brings out a real technological phenomenon and/or real technical problem.

In some embodiments, a problem formulation may not only be of an alphanumeric type, that is in a human natural language, but also may be in combination or alternatively of a graphical type in which windows may be provided with alphanumeric data input bars and/or for entering drawings or graphs.

In some embodiments, the system can have at least an automatic routine for analyzing the human natural language expression and/or the graphical expression and may verify the correspondence of at least some logical or construction rules of the human natural language expression and/or of the graphical expression.

In some embodiments the system may comprise a means for verifying that the input of alphanumeric and/or graphical data requested by a certain window is completed which means further control the storage of the image of the window and of data inputted and the display of the following window in the sequence of windows when the data input step is completed and/or when there is the correspondence of at least some of the logical or construction rules of the human natural language expression or of the graphical expression with which the alphanumeric and/or graphical data requested by said window have been described, while otherwise said certain window is still displayed.

In some embodiments, each window may have an area displaying a window sequence, each one of the windows being identified by a functional name corresponding to the data input action requested thereby, and a field identifying the complete and/or right execution of the operative step requested by the window being associated with each window.

In some embodiments, the system can be provided upstream a system or a method for automated solution of problems and the problem formulation achieved by the system according to the present disclosure can be transformed into a query interrogating a knowledge database for searching a solution.

The present disclosure relates to a method for the computer-aided identification of technical phenomena and particularly for the identification and formulation of technical problems comprising a plurality of alternative steps for assisted formulation of the technical problems according to formulation rules and statement criteria that may be different and specific for each formulation step.

The method may provide three main problem formulation stages, in each one of such stages the problem may be expressed by a different problem formulation rule.

In some embodiments the method may provide two formulation steps for the technical problem wherein the formulation rules request a user to define a space-time arrangement of an element of a technical system affected by an undesired effect and at least a further formulation stage with formulation rules for generating chains of cause and effect for identifying the cause of the undesired effect.

In some embodiments, a first formulation stage may be provided wherein the problem statement can be made by indicating: the element affected by the undesired effect; the type of undesired effect and the operative zone, that is the zone of the element affected by the undesired effect where said undesired effect takes place, while the linguistic expression is requested with from a minimum of three to a maximum of 5 number of words, the words not including adjectives or adverbs.

In some embodiments a second formulation stage can be provided wherein the problem is again expressed but with an increased focus or enlargement of the undesired element or of the operative zone and wherein the formulation again takes place by using the definitions of element, undesired effect and operative zone.

In some embodiments, a third formulation stage wherein one or more hypotheses for actions counteracting the occurrence of the undesired effect may be formulated.

In some embodiments each first, second, and third formulation stage can have one or more intermediate formulation steps according to further different technical problem formulating criteria or rules.

The first formulation stage as described above and namely wherein the problem statement is made by indicating the element affected by the undesired effect; the type of undesired effect and the operative zone, that is the zone of the element affected by the undesired effect where said undesired effect takes place, while the linguistic expression is requested with a minimum of three to a maximum of 5 number of words, and without using adjectives or adverbs, may be followed by two further formulation steps of which one may be an extended formulation where the identification/formulation of the moment when the undesired effect starts or ends is considered and an alternative formulation achieved by exploring or speculating a mechanism.

The first extended formulation step therefore may provide a problem formulation by a linguistic expression providing a specific maximum number of words, not including adverbs or adjectives and comprising the following elements: the element affected by the undesired effect; the type of undesired effect; the operative zone, that is the zone of the element affected by the undesired effect where said undesired effect takes place; the operative time defining the moment when the undesired effect starts or ends in the operative zone.

The first alternative problem exploration step may comprise identifying and formulating one or more technical problems to be solved before solving the main problem wherein the identifying and formulating take place in a time prior to the operative time and/or prior to new technical problems resulting from the non-solution of a main technical problem, the new technical problem taking place in a time after the operative time defined for the main problem.

Such problems may be subjected to a check about their existence and compared with the main problem in order to verify the real problem to be solved and a choice may be given between the main problem and the alternative problems with which it is possible to continue the process.

The first alternative formulation step may be a problem formulation using the following elements or concepts: new problem to be solved in a time prior to the operative time of the main problem; new element affected by the undesired effect; undesired effect; operative zone or new problem resulting from the main problem and to be solved in a time after the operative time of the main problem to achieve useful results even if the main problem is not solved.

Once the main problem and the first extended formulation for this problem are defined, the second problem formulation stage can be performed which may comprise several individual steps as well.

In some embodiments, a second formulation stage may provide a first formulation step where the problem formulation has a more detailed level than previous stages and wherein the problem can be defined by: the element determined in the first extended formulation; the new undesired effect affecting the element at micro level the operative zone of the element at said micro level where the undesired effect takes place and a second extended formulation step wherein the problem is defined by: the element determined by the second formulation; the undesired effect of the second formulation affecting said element and at micro level; the operative zone wherein said undesired effect of the second formulation takes place; and the operative time of the second formulation that relates to the undesired effect of the second formulation and to the operative zone of the second formulation.

The second formulation stage passes to a third formulation stage wherein the technical problem can be formulated according to the following rules, for example, by defining a chain of cause and effect.

The formulation of the cause of the undesired effect and thus of the problem may be achieved by ascertaining how it is possible, using available resources or introducing new ones, to eliminate or counteract presence or absence of a new element in a specific operative zone and in an operative time synchronized with an operative time of a second extended formulation in which the operative time causes a harmful effect described in a second extended formulation.

In some embodiments the problem formulation may be not only of alphanumeric type, that is in a human natural language, but in combination or alternatively of the graphical type, the windows being provided with alphanumeric data input bars and with windows for entering drawings or graphs.

In some embodiments, the method can have at least steps for automatically analyzing the human natural language expression and/or the graphical expression and verifying the correspondence of at least some of the logical or construction rules of the human natural language expression or of the graphical expression.

In some embodiments, verification can be provided that the input of alphanumeric and/or graphical data requested by a certain step is completed on the basis of such verification the storage of the image of the window and of data inputted and the execution of the following step in the sequence of steps is activated when the data input step is completed and/or when there is the correspondence of at least some of the logical or construction rules of the human natural language expression or of the graphical expression with which the alphanumeric and/or graphical data requested by said step in execution have been described, while otherwise the step in execution is repeated.

The method according to the disclosure can be provided upstream a method for the automated solution of problems. The problem formulation that may be achieved by the method according to the present disclosure can be transformed into a query interrogating a knowledge database for searching a solution.

The system and method is now described by way of example. A simple and intuitive technical problem, a toaster burning a slice of bread, is used to demonstrate how the system and method work and to show the effects of the individual formulation steps. This example serves to further describe how the disclosure may work, but is in no way limited to this example or similar examples.

Similarly, the figures show windows that are displayed by the system on the display monitor that may assist and guide the user in identifying the technical phenomenon and in formulating the problem. These figures are examples of embodiments but are in no way limited to theses embodiments.

The method can be incorporated in a set of instructions in the form of software executable by a computer. The system comprises a computer intended to run the software, the software comprising a set of instructions that guide the computer to work according to method steps.

The computer may be a conventional computer, having a display, for example, a monitor; a means for inputting alphanumeric data, for example, a keyboard; a mouse or mouse equivalent; and a graphical drawing means both in the form of drawing tools and/or a program.

Other peripheral units may be provided, for example, a scanner for acquiring images, which can make a graphical problem formulation easier. Any further known variant or configuration of a computer can be provided falling within the basic skills and knowledge of the person skilled in the art. The software can be stored in an internal and non-volatile memory of the computer from where it is loaded in order to be run or it can be provided on a portable medium that is fitted into a drive from where the code is read and supplied to the working memory of the computer for being run.

The windows may be substantially equal to one another and can have a frame with a title bar (1) showing the step in execution and an area (2) wherein alphanumeric data can be inputted, for example, by a keyboard. A further area may be provided in at least in some of the windows where drawings, graphs and/or images may be entered. The areas can be separated and for example, adjacent or it is possible to provide one area accepting both alphanumeric data and drawings, graphs and/or images.

A further area may have a sequence of tags (3) whose appearance is modified during execution of several steps by the system, the appearance being variable depending on whether a corresponding step is in execution, has been properly executed, has not been properly executed, or has ended.

Other fields denoted by (5) and (6) are used for inputting check marks and for indicating rules or suggesting formulation modes.

FIG. 1 shows a flow diagram of a system the disclosure.

The system may perform a sequence of formulation steps for a technical problem, performing problem formulation according to specific expression rules and using specific expression criteria.

Steps are grouped into three problem formulation stages that can be performed successively, each step providing a plurality of steps that can be performed successively as well. Each stage may be preparatory for a following stage.

The first two stages can be provided to define a problem as an undesired effect affecting an element in a given zone, in a given moment. Such formulations may serve to clearly define and express the space-time arrangement of the element and of the effect thereon.

The third stage may serve to generate cause-effect trees allowing a real technical problem to emerge, free from prejudices or interpretations and/or not hidden by side problems and/or secondary problems.

In FIG. 1, a first stage with steps of a first formulation (10), a first extended formulation (11), and first alternative formulation (12), can be identified.

The expression result of the formulation of the first stage may serve as a starting point for the second formulation stage comprising a first step of second problem formulation at micro level (13) and an extended formulation step (14). The third stage is summarized in a single step (15), but can provide a certain number of individual steps, as described below.

The third step of the first stage (12) may serve to define and formulate alternative technical problems and for verifying them in relation to the first formulated problem. The check step may serve to choose among the several alternative problems and to define a choice with a respective formulation as an identification and formulation result of the technical problem provided by the first formulation stage.

With reference specifically to the several stages and steps constituting them, as regards the first formulation step of the first formulation stage, the technical problem formulation may be requested with a very poor expression form and with a restricted number of words that cannot be adverbs or adjectives since they suggest per se a judgment.

A technical problem may be first defined with reference to an undesired effect, to an element affected by the effect and to an operative zone of the element in which undesired effect may take place.

To aid in properly defining elements, as shown in FIGS. 2 to 5, a technical system wherein a problem takes place may require a name (FIG. 2) in field (6) wherein a rule can be provided asking to restrict a description of the system to a maximum of 10 words.

Figure 3:
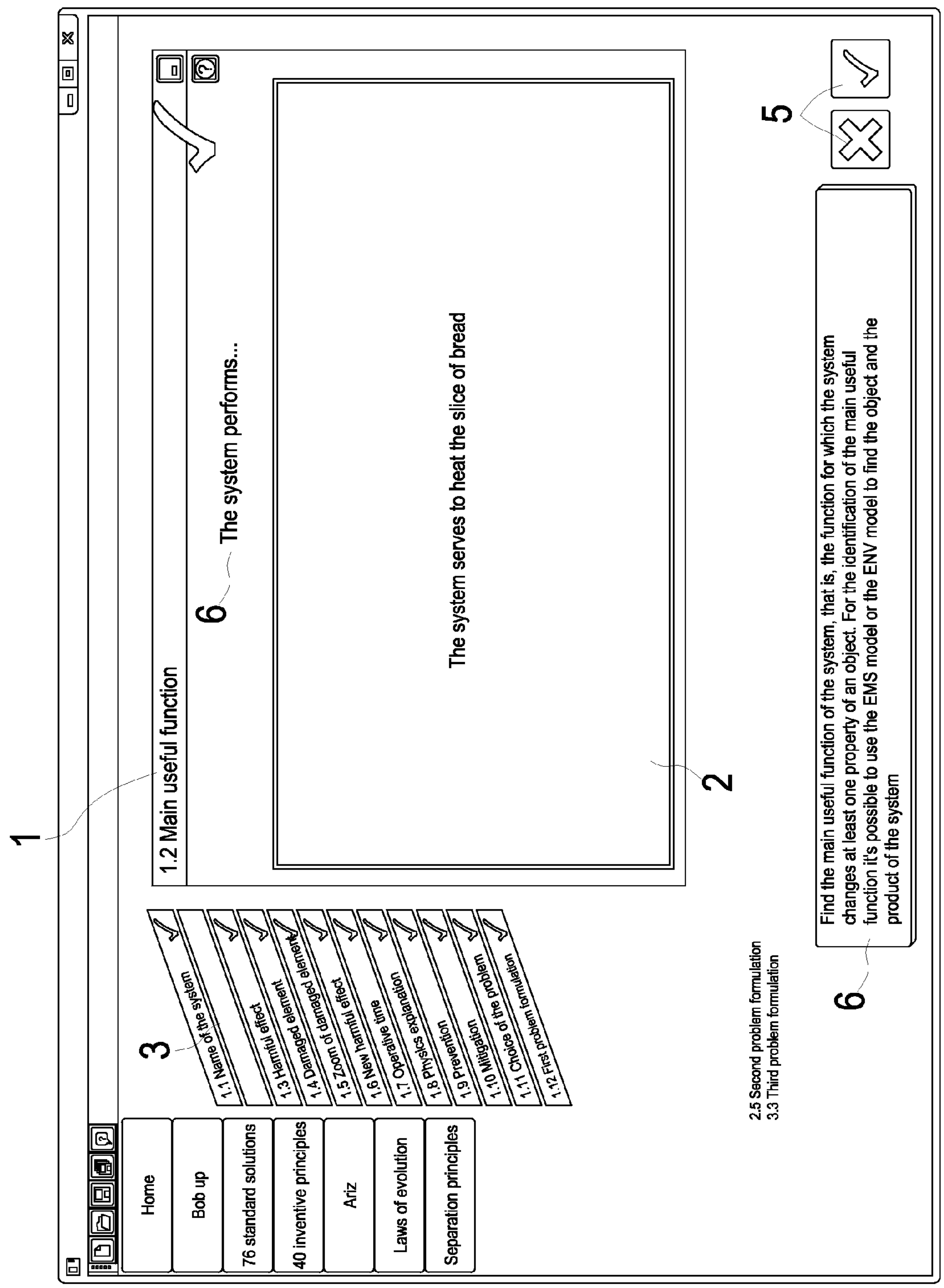

Once this step is completed it can be ticked and the step defined in FIG. 3 can be entered here the main useful function has to be described. The tick, for example, in field 5 allows the following window shown in FIG. 4 to be entered.

Figure 4:
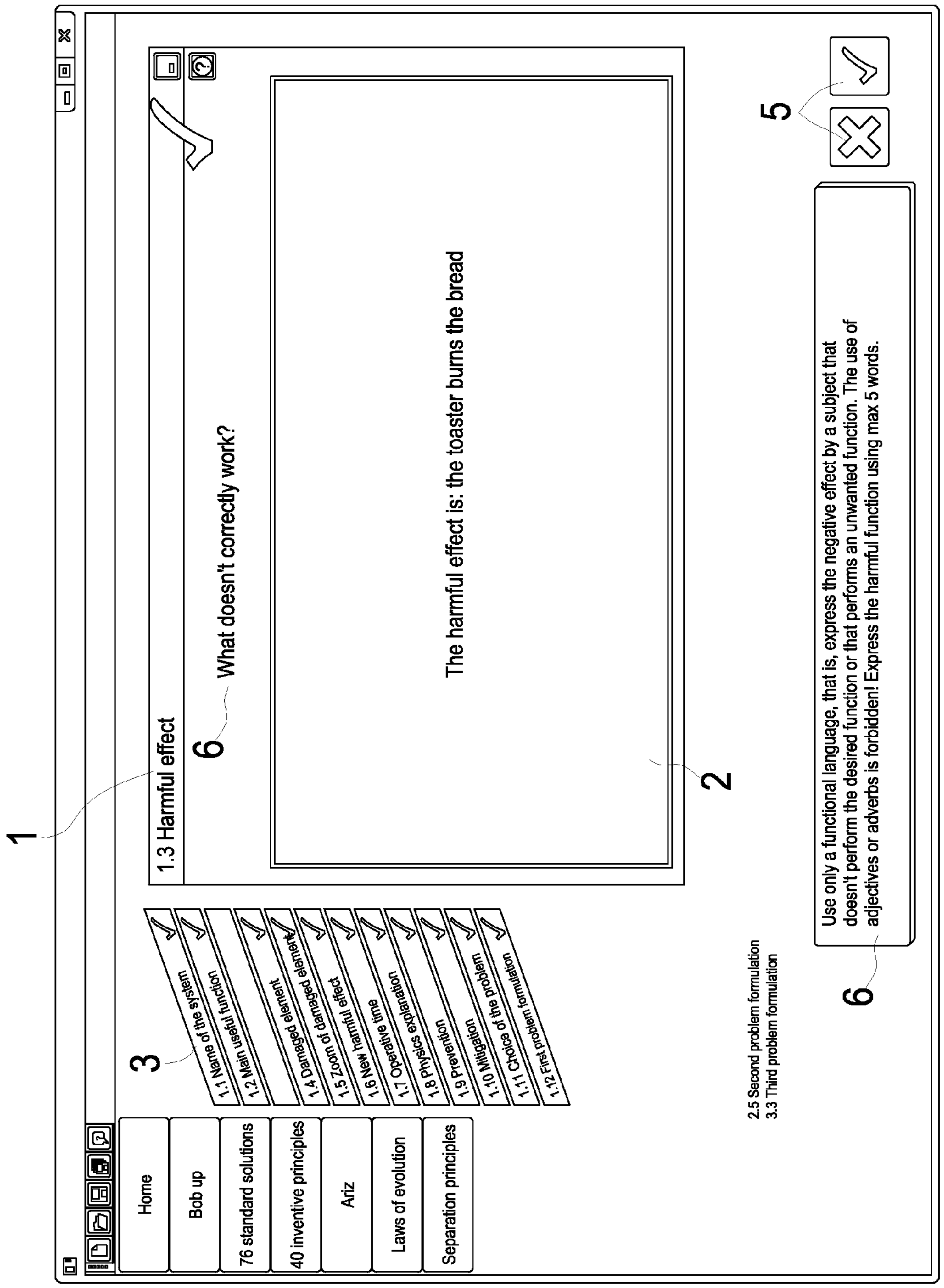
Figure 5:
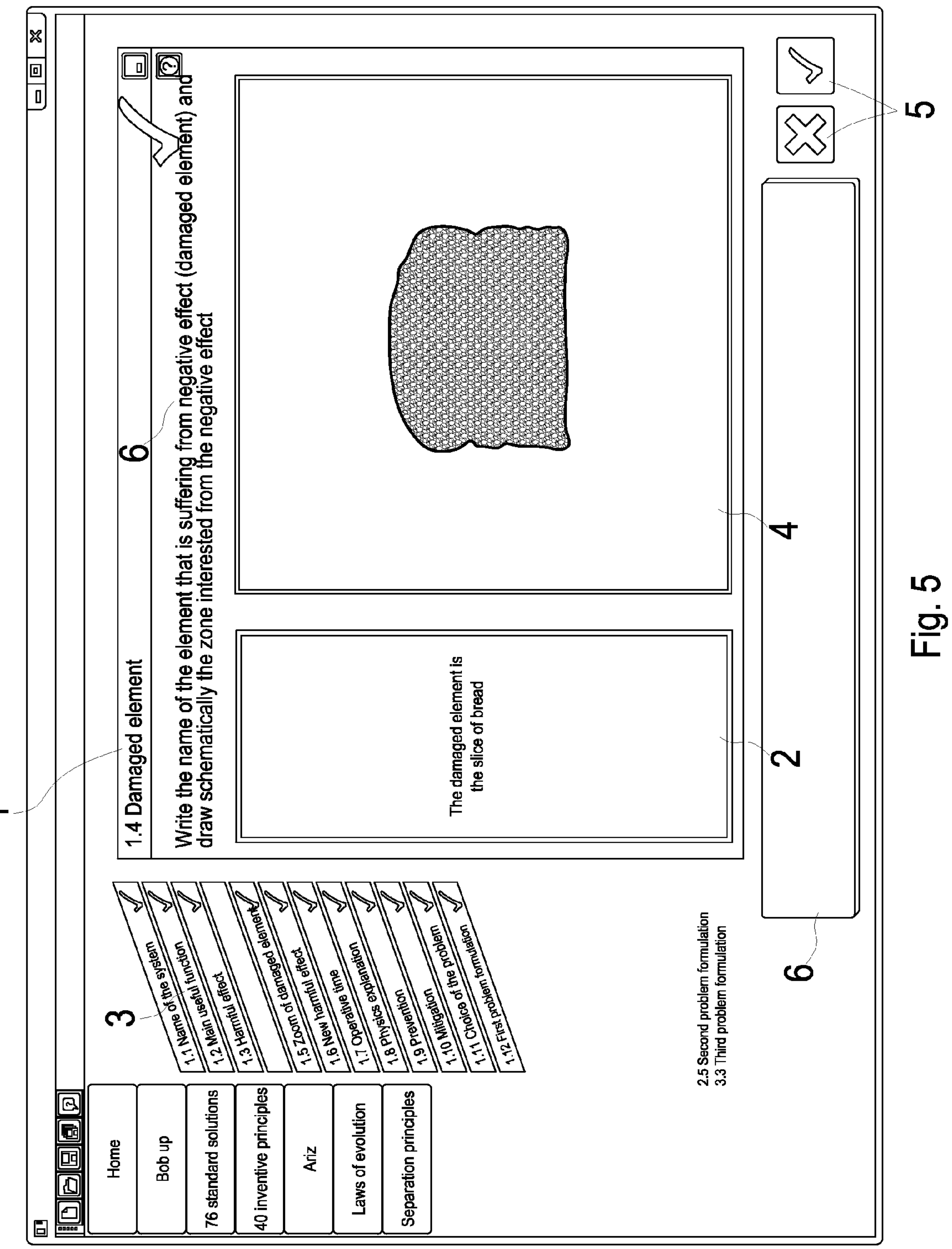

In the window of FIG. 4 the undesired effect may be required to be defined and correspondingly formulated. In the toaster example, this is represented by the fact that the toaster burns the bread.

Field (6) shows a corresponding rule providing only a functional language, wherein the harmful effect is expressed by a subject that does not perform a desired function and that does perform an unwanted function, wherein the language does not include adverbs and adjectives there may be a maximum number of words.

Window (5) shows the step defining the element and particularly the damaged element.

Here two fields are provided, one for definition by human natural language and thus in the form of alphanumeric data, and a field wherein it is possible to draw a damaged element or to input a photo, image, or other graphical representation.

Drawings or graphical representations, for example, can be prepared by drawing programs such as CAD programs or virtual reality programs, and can be imported and displayed in a dedicated field. It is also possible to provide a link to a CAD or virtual reality program or a program generating graphical representations that can be activated automatically or when necessary upon the movement of the cursor in a field intended for inputting graphical information.

The undesired effect is a concept adopted from TRIZ theory, particularly from SU-field analysis of TRIZ. It can be selected among the effects that are perceived as harmful by the user. A harmful effect may be expressed both in functional terms and in terms of parameters. In both cases a harmful effect may be a characteristic of a system which may be perceived as being harmful, including but not limited to, a missing or insufficient characteristic and/or a characteristic that is desired to be modified or removed in any manner. Its proper definition can be very delicate in the first stages of the problem and can thus be compromised by influence of psychological obstacles and/or by subjective interpretations.

The method and the system according to the present disclosure may work on subsequent formulations of an undesired effect trying to connect it to a physical area of an element of the system in a specific time period. Therefore the undesired effect may be associated first to a specific element.

In the first stages collecting and evaluating information there may be a risk that subjectivity can corrupt identification of the undesired effect, which may be due to a user expressing an opinion about the collected data. Therefore it may be necessary to interrupt any subjective evaluation of collected information. Moreover, there may be psychological obstacles that lead a user to look at the problem in a warped manner, and also that lead a user to operate in a zone that we consider to be safer and to be protected by our skills, for examples, a chemist towards chemical problems and a mechanic towards mechanical problems.

To avoid such subjectivity, the undesired effect can be defined by initially leaving a starting technical system and by concentrating only on a single element that may be the element which is most sensitive to this effect.

Thus, initially no cause-effect analysis or physical interpretations about how such effect is generated may be required.

Moreover, rules may be provided for defining the undesired effect, which favor greater objectivity to be kept on collected information. For the formulation of such effect one may use a maximum of 5 words, excluding adjectives or adverbs, as these are typical forms of subjectivity. For example, if the toaster “burns” the bread, the undesired effect is related to an unwanted mode of the "heating" function. Thus the user shall be brought to a first formulation in terms of subject, verb and object.

The undesired effect can be functional concept that may be described without using adjectives or adverbs and with a very low number of words.

The element can be defined as the element receiving the undesired effect.

Figure 6:
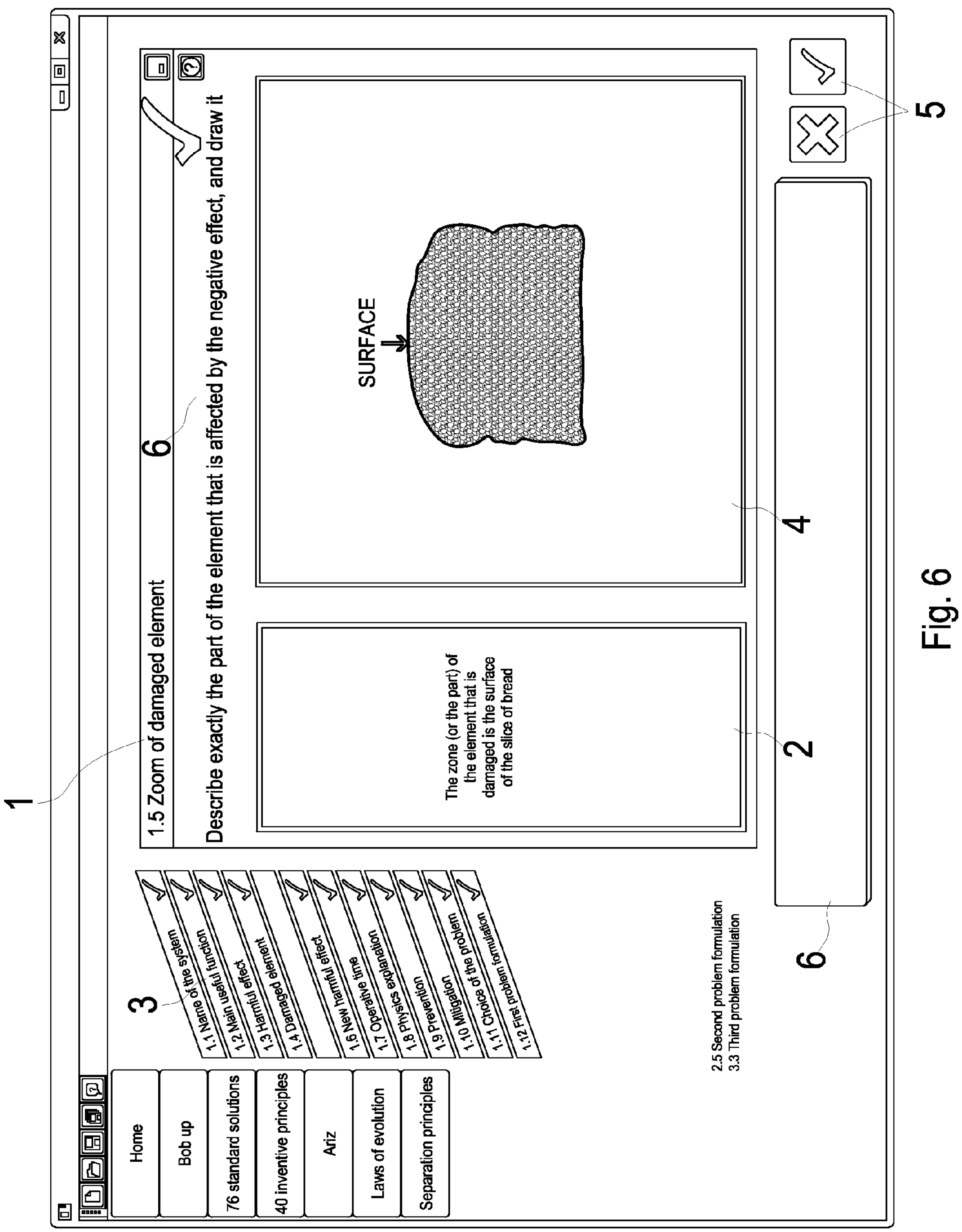
FIGS. 6 and 7 depict embodiments of windows displayed on the monitor of a computer for executing a first formulation step.
Figure 7:
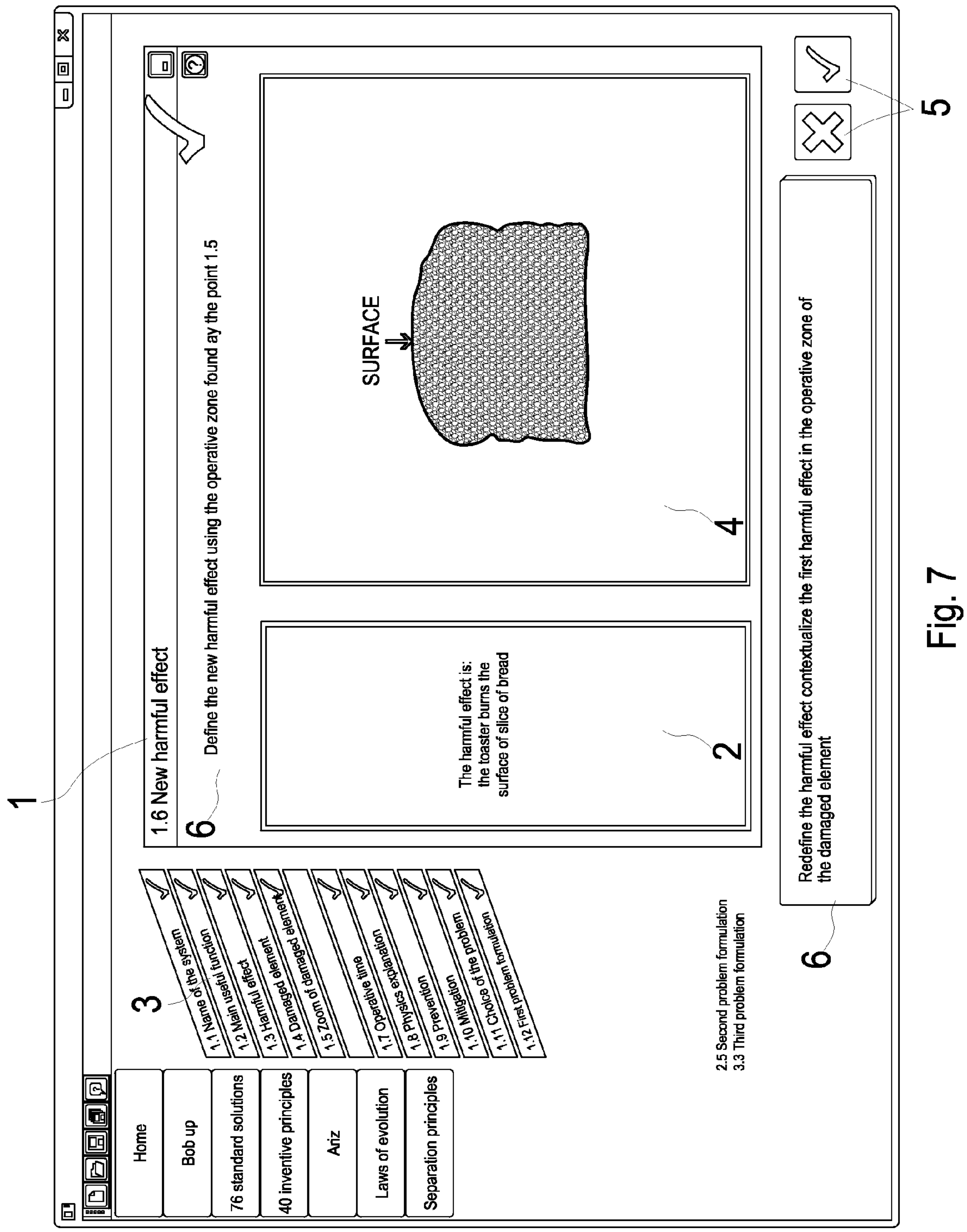

The second step is shown by way of example, by the windows shown in FIGS. 6 and 7. This is the first extended problem formulation. In this case the term operative zone means the zone wherein the effect may exactly take place. The concept of operative zone is a meronym of the element or also the overall element.

Within the first formulation step of the technical problem the latter is expressed as <the element> affected by <the undesired effect> in an <operative zone> thereof. The concept of operative zone, is used for defining the place where a certain phenomenon, a certain action take place or can take place. It can be for example, a material zone, as the operative zone of a police force, where it is the whole part of the territory where it works, or it can be an immaterial zone, as the operative zone of a justice of the peace, which may be limited by economic value of lawsuits.

Within the first problem formulation, an operative zone of interest is not a zone in contact with a further object, that has not been defined yet (as in TRIZ), but it is an operative zone only of the harmful effect, in particular it may be the exact part of the element affected by the harmful effect upon which the harmful effect acts is desired to be defined. Often, wrongly, a user may have the tendency to generalize by defining an operative zone as wider than it really is, for example, by stating that a whole element is affected by a harmful effect, which may be due to an incorrect analysis or an analysis made with too little detail. To effectively define the zone affected by the harmful effect, as seen in FIGS. 6 and 7, the user may be required to increase the level of detail, and to define the specific zones where the harmful effect occurs.

The use of meronymy (a part of.)/hypernymy (of the type) linguistic relations (for example automatically taken from Wordnet 3.0) associated to the element affected by the harmful effect, helps in obtaining a more univocal and precise definition and in thinking to the change in the level of detail without directly operating on the system.

Even the compulsoriness of using a sketch for drawing the operative zone helps in eliminating the ambiguity of the definition since the point of view of the user is understood and the selected level of detail becomes concrete.

Here the definition of the operative zone, instead of being a mere description, may be the sum of a formal definition, a sketch and/or a meronymy or hypernymy linguistic relation.

FIG. 6 shows a window wherein in a first step, zooming in on the operative zone, one passes from the bread slice to the surface thereof. Even in this case a formulation rule or other information may appear above the alphanumeric data and graph input fields.

The zoom step of the window in FIG. 6 may define a new undesired effect related to a different operative zone.

In this case the formulation of the new undesired effect is "the toaster burns the surface of the bread slice".

In the field above the alphanumeric and graphical data input fields and in (6), under the latter the task to be performed may be shown.

Figure 8:
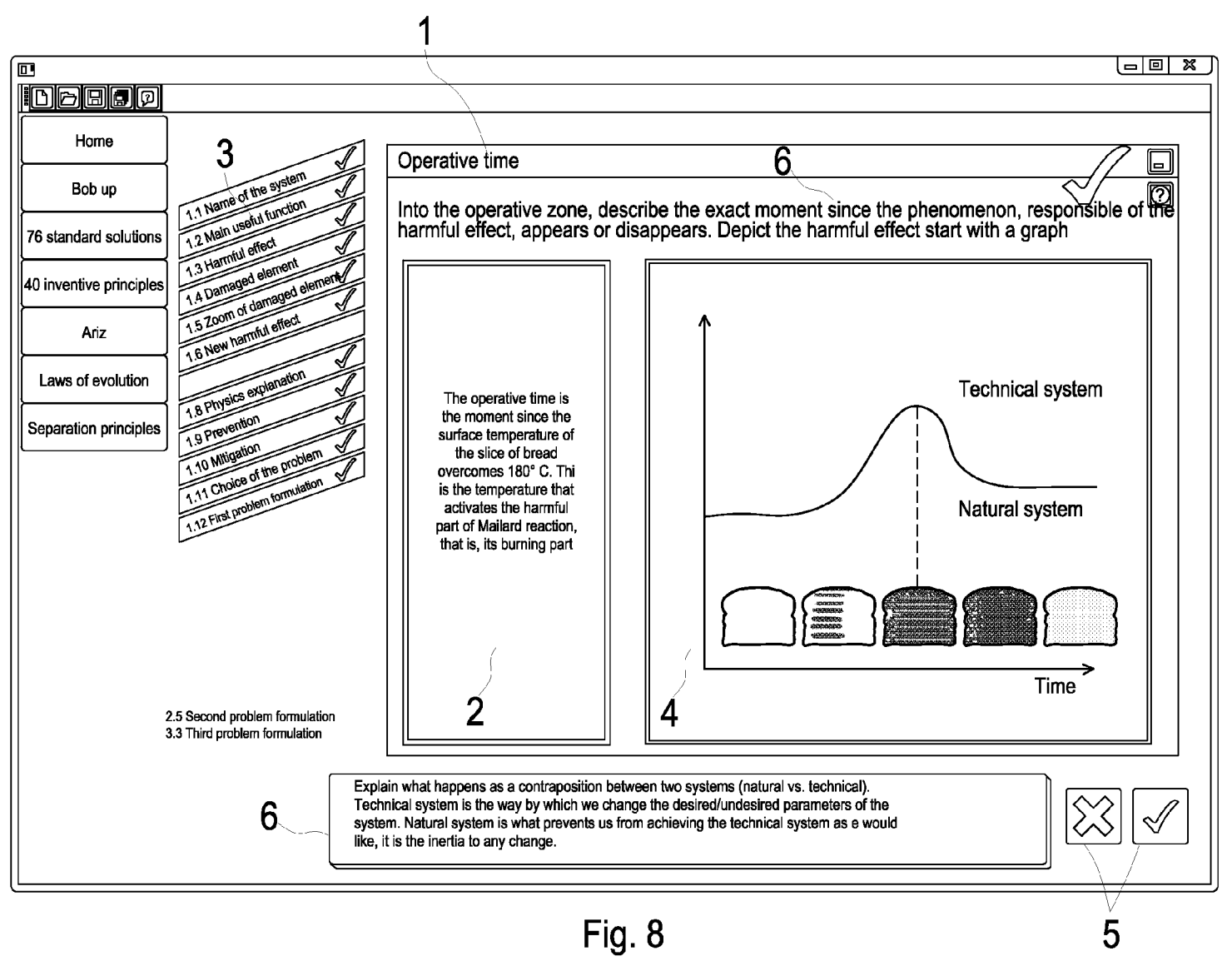

FIGS. 8 and 9 show windows which may relate to the execution of the first extended formulation step. The problem may be formulated as it follows: <an element of the first formulation> affected by <the undesired effect> in its <operative zone of the first formulation> and at its <operative time>.

In the method and system of the present disclosure, the definition of the operative time can be simpler than definitions used in conventional systems.

In the present disclosure, the operative time can be a means for adjusting the operative zone in view of interpretation of the phenomena occurring therein, thus avoiding subjective interpretation of technical system.

In the present disclosure, the operative time can be defined in relation to the operative zone described in the moment when a precise physical event starts or ends.

In order to precisely define a time range of the operative zone, the system may be analyzed from a physical point of view and then represented as a contraposition between two opposing systems: the technical system and the natural system.

The term "technical system" as used herein is defined to mean a system that performs a main useful function in a desired manner. For example, a technical system is a system that is introduce in nature to do what the nature is not able to do and to achieve a given technical effect.

The term "natural system" as used herein is defined to mean a system opposing the technical system, that is the behavior of nature intervening and counteracting its normal operation, and being regulated by the physical laws of nature.

Figure 10:
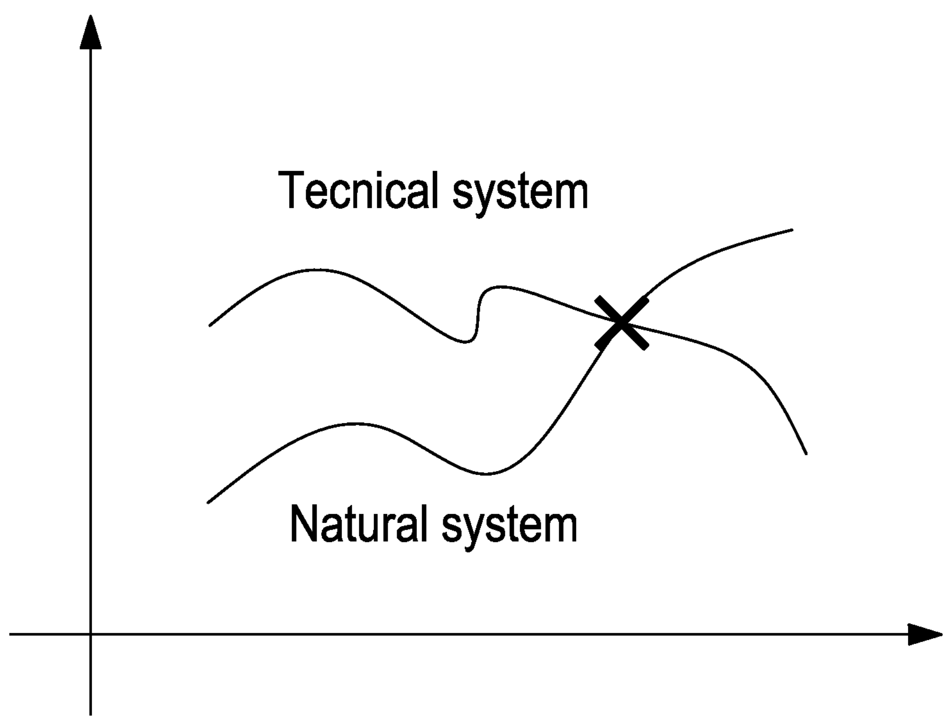
FIG. 10 shows behavior of a technical system and of a natural system for defining two operative times.

A technical system is able to perform its function in a desired manner as long as it is able to overcome a natural system, however when the natural system succeeds in overcoming the technical system, a harmful effect arises. In order to formalize the technical system and the natural system, they are represented in a Cartesian graph with two lines, describing their relative behavior as shown in FIG. 10. Intersection of the two lines represents a time when the natural system overcomes the technical system with concomitant presentation of the harmful effect. This time is the operative time.

The classic risk is to analyze more than it is necessary and to analyze superficially, with an un-suitable level of detail. Once the operative time is defined according to instructions and rules displayed above and below the alphanumeric and graphical data input fields (2) and (4), the extended statement step may require the formulation of a physical explanation. The description of the system by the operative zone and operative time sequence may allow physical laws regulating the technical system to be defined, during the execution of the main useful function, and the "response" physical laws of the natural system to be defined which have the tendency of counteracting the transformation from object to product of an element, with greater clarity and precision.

As shown in FIG. 9, the formulation of the operative time has been entered in the alphanumeric field (2). With reference to the example of the toaster, the operative time may be defined as the moment when the temperature of the surface of the bread slice exceeds 180° C. This can be the temperature that triggers the Maillard reaction, resulting in burning of the surface of the bread slice.

A physical description can then be entered in field (2) of the window of FIG. 9 and is shown as follows: "The toaster heats the bread with two thermal fields: a field is a thermal convection and the second is a thermal radiation one. These two thermal fields tend to warm the surface of the slice of bread: in particular, the convective field warms the bread evenly and slowly, while the radiation do it more fast and strong. In fact, the layer of air, near the surface of the slice of bread, warms slowly (it in fact will not be much hotter than the surface of the bread itself) and evenly the bread, while electromagnetic waves cause intense and localized increase of heat."

The last step of the first formulation stage of the technical problem is defined as a first alternative exploration of the problem. After having explained the events from a physical point of view as in FIG. 10, it is possible to have new elements affected by undesired or harmful effects or to have other methods for modifying the technical problem by moving back or forward in time with respect to the operative time related to the operative zone defined in the previous steps.

Therefore the method may give the user the possibility of defining new elements and new problems and to perform a process for verifying whether or not several alternative problems are really the main problem for the technical system under investigation in relation to the harmful or undesired effect previously found and defined, for example, that the toaster burns the bread slice.

Figure 11:
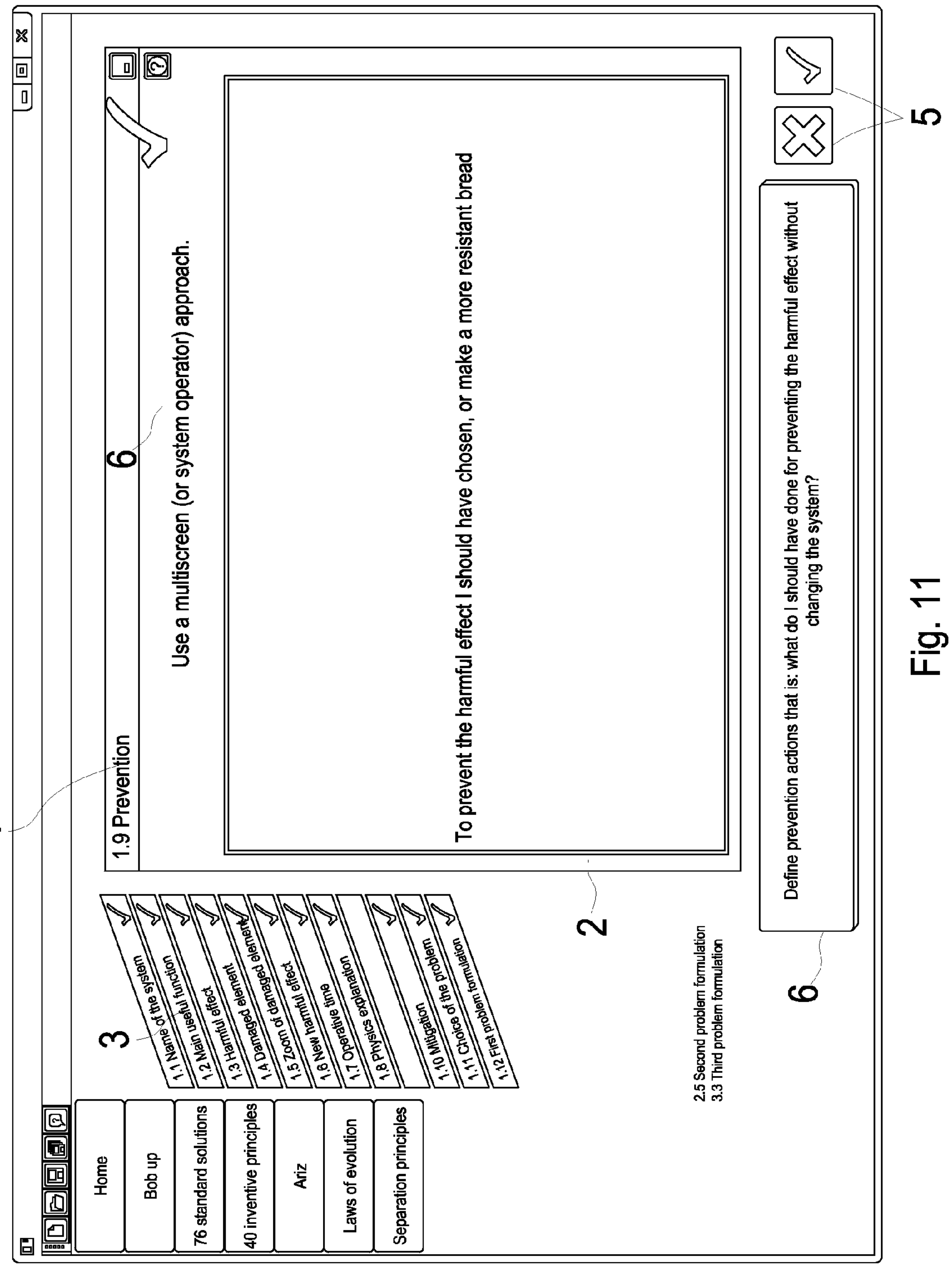
FIGS. 11 and 12 are embodiments of windows displayed on a computer monitor for executing an alternative problem formulation step.
Figure 12:
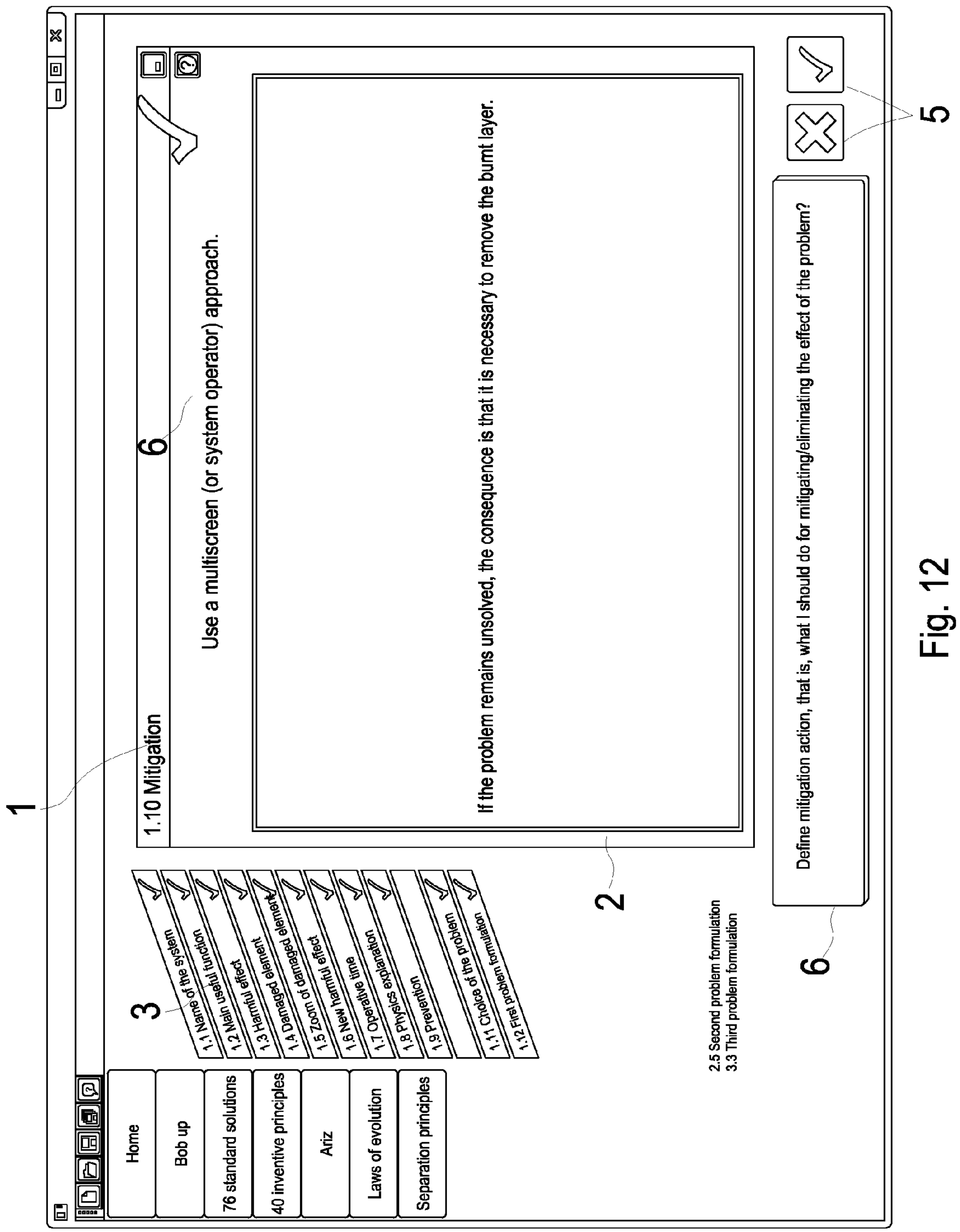

Therefore three successive new windows may be suggested. For example, one is shown in FIG. 11 for inputting an alternative identification and formulation of a new problem which may be preventive, for example problems that could be solved upstream the solution of the problem previously analyzed in order to prevent the undesired effect from occurring.

The following window (12) relates to the step for inputting a statement of a new problem that is a future problem, that is a problem resulting from the problem defined and formulated in the previous formulation steps and that has should be solved in order to achieve good result even if the main problem defined and formulated in the previous steps is not solved.

Rules or instructions in the field (6) or above the data input field may guide the user.

This formulation step can be provided in an advanced stage of the formulation process when the user has a more precise idea about the events leading to the undesired effect.

The alternative formulations shown in the windows are, for example, preventive formulations, i.e. providing a stronger bread and the mitigation formulation i.e. removing the burnt layer if the main problem relating to the fact that the bread is burnt is not solved.

Each time an alternative is formulated, it may be examined and to the user may decide whether to continue with the problem partially defined or to proceed with an alternative prevention or mitigation problem. A choice can be made by using a specified command. The action to be taken is shown in the window as in FIG. 14.

Once the problem may be decided, namely if the result of the check is positive, the first formulation stage may end, wherein the field (2) is filled with a summary of the formulations previously made in the several formulation steps.

This can be made both automatically by the system providing a recovery of the entered data and displaying them together either partially automatically and partially by the user by allowing the text and graphical information to be corrected, integrated or modified like a text written by a word processor or a graphic program.

After the first formulation stage which may be performed by considering the element at macro level, the second formulation stage beings providing an analysis of the identification and formulation of the problem at micro level.

In this case, the problem may be defined and formulated by considering the element defined in the first formulation stage and the undesired effect to which it is subjected, but may be defined and formulated at a smaller or micro scale. Therefore a new definition of the undesired effect and a new definition of the operative zone wherein such undesired effect occurs can be provided.

Concepts that are introduced in the first formulation step of the second formulation stage, therefore, may be the new undesired effect defined with a smaller scale level and the new operative zone at the smaller scale level.

Figure 15:
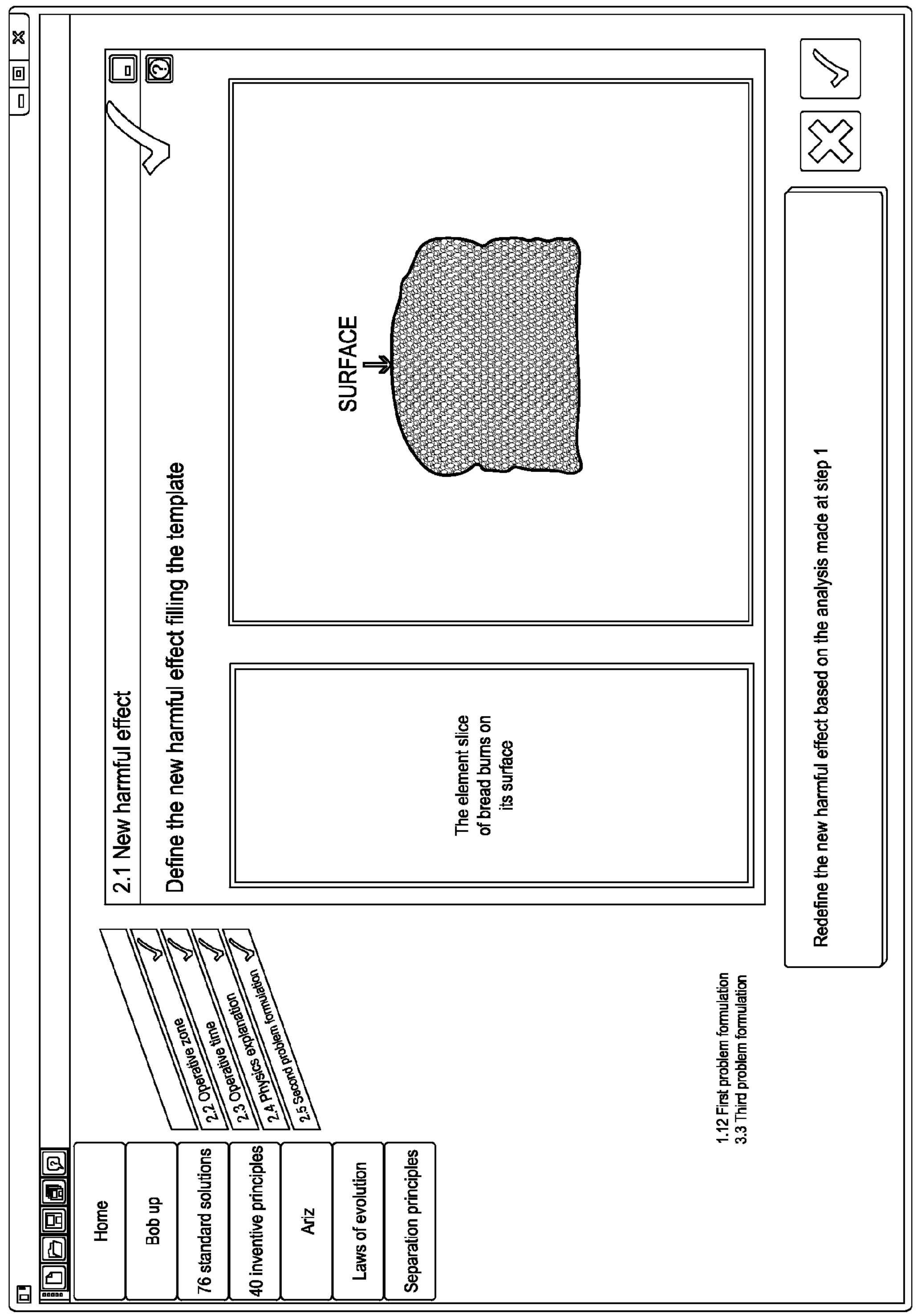

In order to simplify the statement and formulation of the undesired effect on a larger scale, the new operative zones the system may use a simple and intuitive graphical tool which may provide more details in the zones where the effect occurs and those where such effect does not occur by differentiating them with small circles of different colors overlapping said zones as shown in FIG. 16. FIG. 15 shows the initial window of the first step of the second formulation; the problem defined in the first stage may be considered both graphically and by human natural language and the request for redefining the undesired effect appears in the indication fields.

In the window of FIG. 16, the example defining the new operative zone by using different colored circles is shown.

Execution modes are shown in the field above the graphical data input field (4) and in field (6).

The surface of the burnt slice of bread that up until now was the operative zone is enlarged, and the zones of the burnt surface are separated from each other; the dark ones and the clear ones are differentiated.

It is also possible to build a section of the zone as shown in the lower drawing of field (4) that relates to a further enlargement.

Field (3) shows the definition of the new operative zone defined at micro scale level as the zone where the undesired effect occurs for the first time.

In this example such zones are composed of the crests of the surface of the slice of bread represented by circles of a given color.

In this example, the results of the second formulation stage are clear. After defining that the problem to be solved is really the original one and not an alternative one, the definition of the harmful effect can be repeated in the light of the new physical formulation.

The relevance of this stage is that the subjective concept of the undesired effect can be abandoned and replaced by a precise definition, the element arising from the previous stage and represented in the drawing of the operative zone and in the operative time such as that shown in FIG. 15.

In the second formulation stage, a passage to a more detailed level (micro level) may be provided by a technique involving the breaking down into circles denoted by (20), (21), (22) in FIG. 16 and that in the displayed image are represented with different colors depending on the different associations of characteristics to be taken by such points. The image of the operative zone used in the first formulation stage is enlarged and is filled with these small circles, forcing a user to systemically think of each point of the system as an independent microsystem with respect to all the other surrounding microsystems, each one potentially having different characteristics. Breaking down the system into microsystems, by the graphical strategy of "breaking down the image representing the operative zone into circles can allow psychological obstacles leading to think of a system, or a part thereof, as perfectly homogenous to be removed. The aim is to still increase the enlargement level with which the system is analyzed, and to define more accurately and precisely the operative zone of the element affected by the harmful effect as it occurs in FIG. 16 where the section is at a greatest enlargement level.

The new formulation at micro level of the operative zone can be followed by a second formulation step comprising an extended problem formulation step within the second stage.

Figure 17:
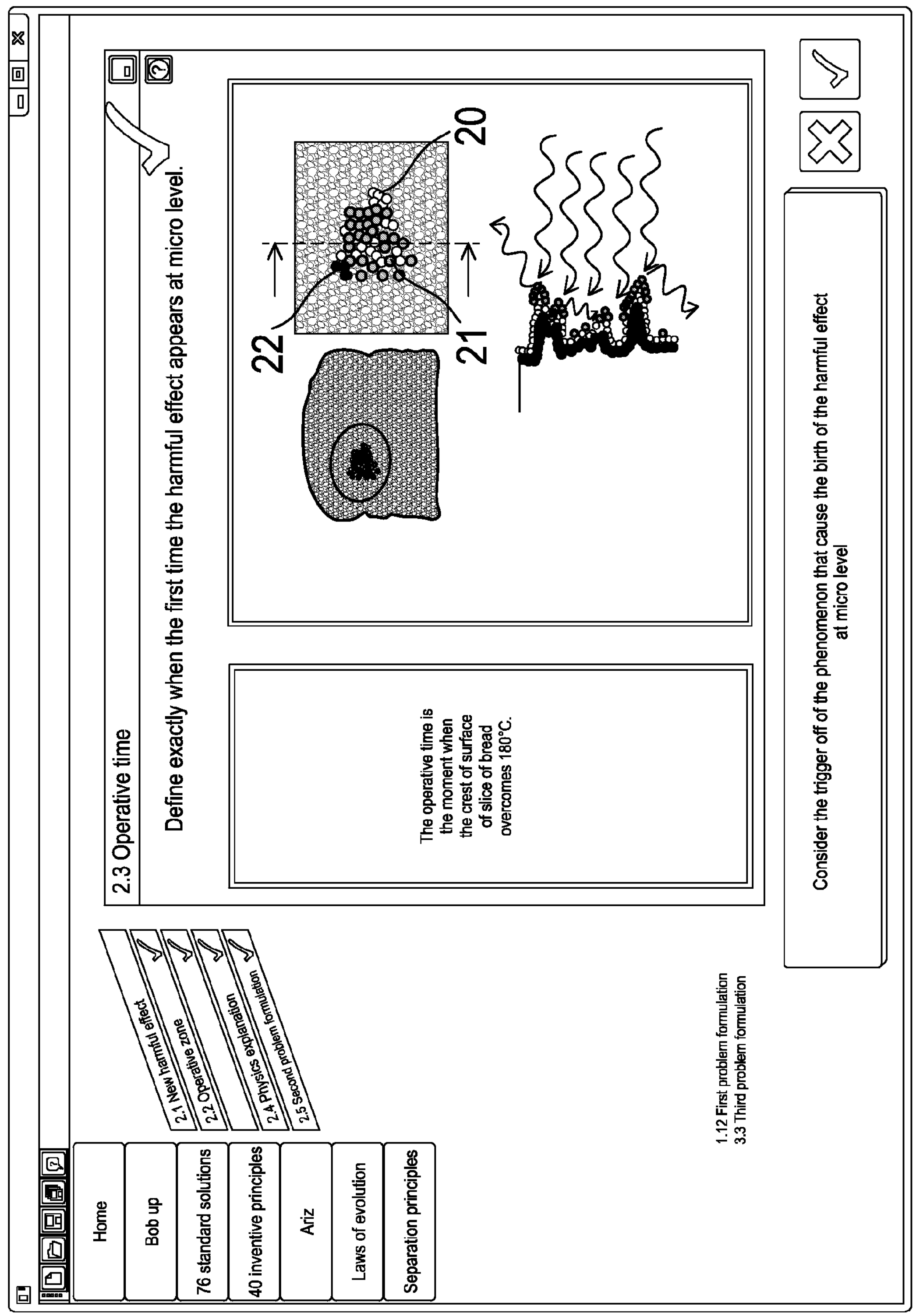
Figure 18:
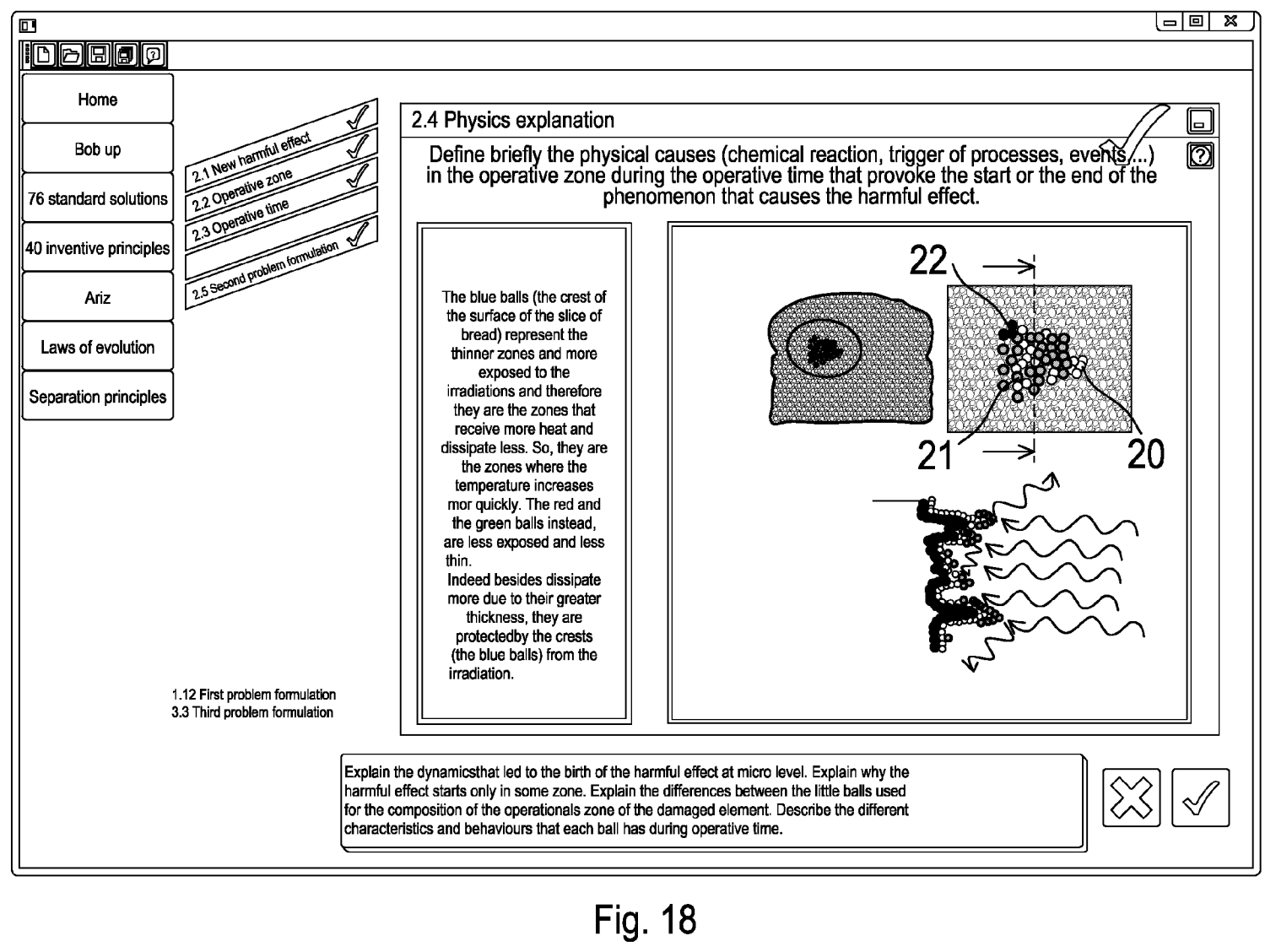

The extended formulation step of the first stages as shown in FIGS. 17 and 18, the operative time may be defined and a physical explanation of the phenomenon given. The new operative time may relate to the time when the undesired effect starts or ends on the new operative zone defined at the micro level. It should be noted that the operative zone passes from the definition of surface to that of surface crest.

The passage imposed by the second formulation from macro to micro level, may require a new time allocation, which may be necessary since a change, if any, in the level of detail inevitably leads to a different physical description of the event. For example, the operation can be through of as a chain. As long as the analysis is performed at a small level of detail, it may be described in terms of a flexible system. As soon as the level of detail becomes higher, up to the analysis of a single link, the description may relate to individual interconnected rigid systems.

Figure 19:
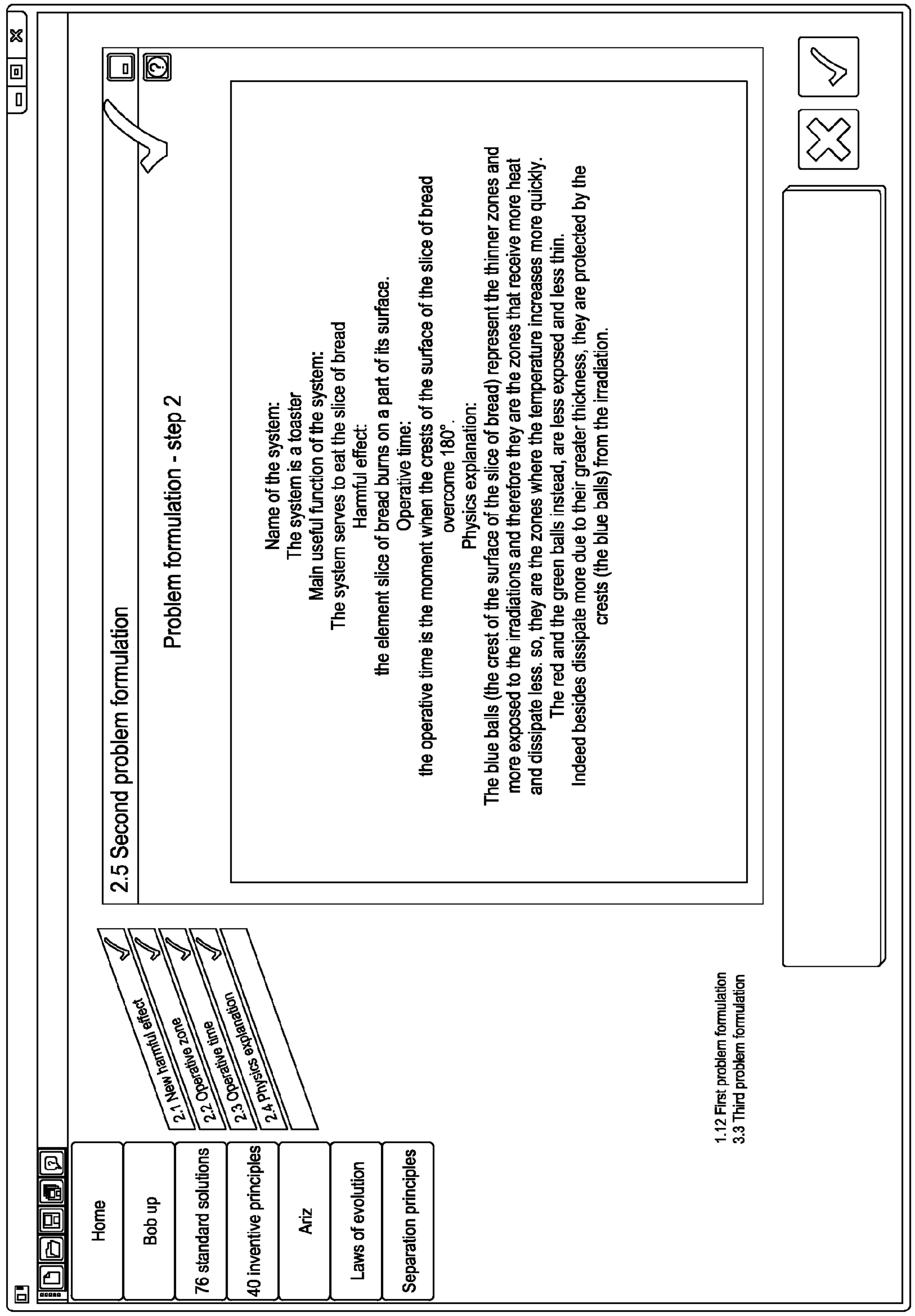
FIG. 19 depicts a final window of a second problem formulation stage.

At the end of such step as shown in the window of FIG. 19 and likewise to the first formulation stage, a summary of the problem statement and formulation of the second formulation stage may be displayed. Even in this case, such summary can be automatically made by the system that recovers the entered data and displays them together or can be made partially automatic and partially by the user by allowing the text and graphical information to be corrected, integrated or modified like a text written by a word processor or a graphical program.

After a second iteration of the problem formulation at the end of the second formulation stage, the space-time arrangement of the element affected by the undesired effect may end. Now it may be necessary to find the main cause of the undesired effect. The approach used can be typical cause and effect type approach, but unlike all the methods using such tool where it is used without defining an a priori level of detail, the causal chain can be introduced in a precise moment and may act on a precise operative zone which may be defined in the second extended problem formulation step of the second formulation stage. Thus it is possible to display where the element generating the undesired effect is, synchronized on a precise physical zone and in a specific moment. The more the user goes into the physical details of the system the more the cause-effect relations can change over time. In this case the use of the cause-effect relation may be considerably more detailed, more precise and severe. The causal element is not generally considered as the element interacting with the element affected by the harmful element as it normally is in the traditional cause effect relation. On the contrary, the element acting under the particular conditions of the operative time that is synchronized in a moment and on a precise level of detail can be considered.

There can be different cause effect schemes depending on the number of possible causes and whether or not the causes depend on one another to illicit the harmful effect. In the case of two different causes, at least four different combinations can be envisioned:

First Combination

A single cause generates to the undesired effect.

CAUSE→UNDESIRED EFFECT

To eliminate the undesired effect, the problem to be solved may be one which is that of eliminating or counteracting the defined cause.

CAUSE ✕→ UNDESIRED EFFECT

Second Combination

A chain of causes is determined which generates the undesired effect.

CAUSE 1→CAUSE 2→UNDESIRED EFFECT

In order to eliminate the undesired effect, there are as many problems as the involved causes, among which one has to be selected.

After selecting the cause on which one has to operate, the problem is to eliminate or counteract the defined cause.

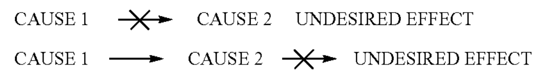

Third Combination 2 or more causes are defined which can be sufficient individually to generate the harmful effect.

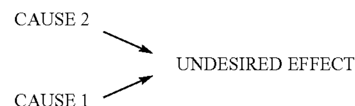

In order to eliminate the undesired effect, as many problems as the causes may need to be solved: eliminate or counteract all the defined causes.

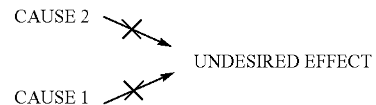

Fourth Combination 2 or more causes are defined, which may be necessary in combination to generate the harmful effect.

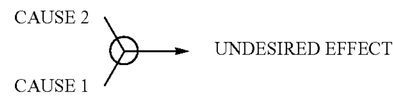

In order to eliminate the harmful effect, there are as many problems as the involved causes, among which one has to be selected.

After selecting the cause on which to operate, the problem may be to eliminate or counteract the defined cause.

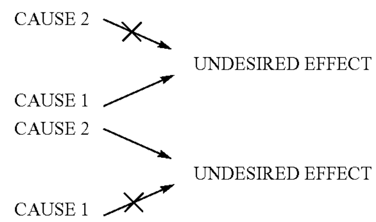

Figure 20:
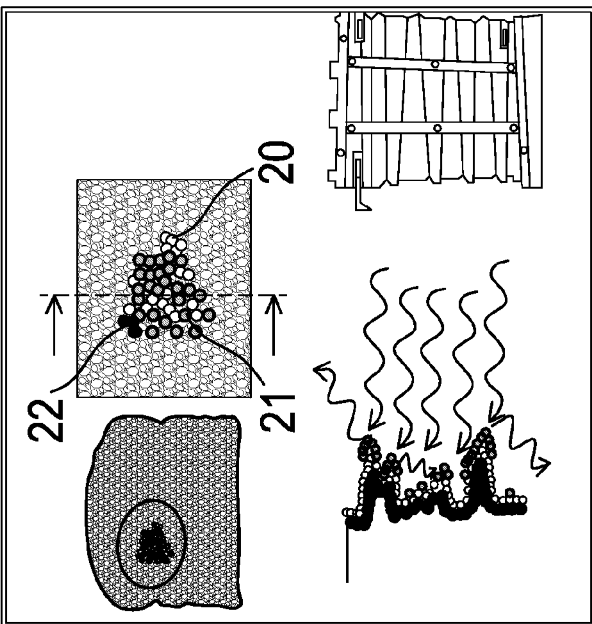
Figure 21:
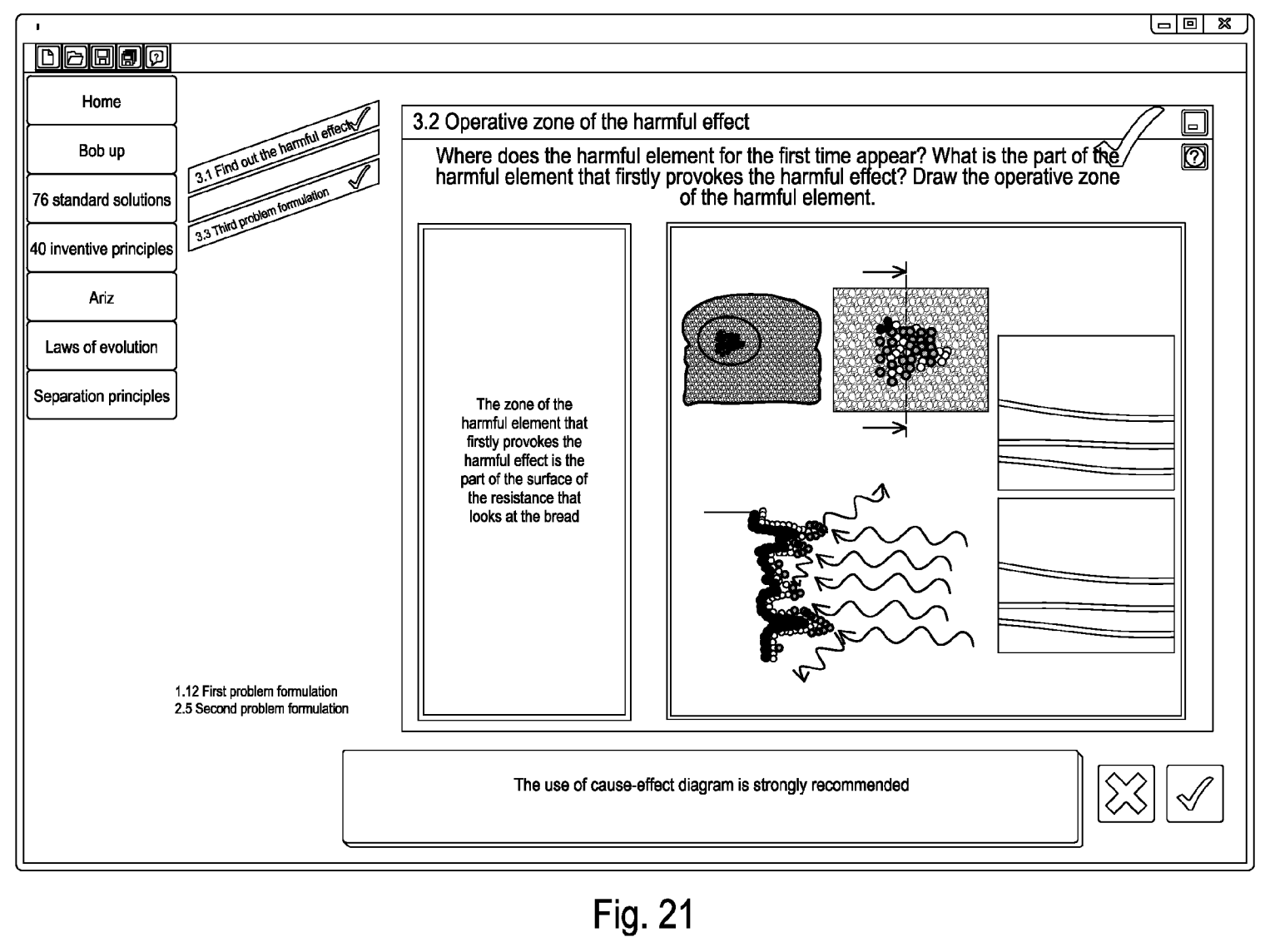

The windows shown in FIGS. 20 and 21 summarize the cause and effect definition according to the step of the first cause and effect combination.

In the window (20), the element generating the undesired effect is formulated and defined. In this case, the problem is the electric resistance of the toaster, a pair of causes, radiation and convection.

In field (6) the use cause-effect diagrams can be made by loading a parallel routine using, for example, graphical/alphanumeric software means that aid in making such diagrams.

The graphical field (4) near the image at the micro level of detail shows the image of the resistance.

The following window of FIG. 21 can define the operative zone of the element generating the undesired effect defined in the previous window, the operative zone being the part of the surface of the resistance that looks at surface of the bread slice.

Now the technical problem can be defined from the perspective of the element generating the undesired effect and of its operative zone; the final window is displayed which sums up the problem formulation at the end of the third step (FIG. 22).

The summary in the natural and/or graphical language can be made both automatically by the system providing to recover the entered data and to display them together or partially automatically and partially by the user by allowing the text and graphical information to be corrected, integrated or modified, for example text written by a word processor or a graphic program.

With reference to the provided example, the window can display the following data:

Name of the system: The system is a toaster

Element: The element that causes the harmful effect is the electric resistance.

Operative zone: the zone of the element that generates the harmful effect and that firstly provokes such harmful effect is the part of the surface of the resistance that looks at the part of the surface of the bread that is burnt.

Harmful effect: the element burns the slice of bread on a part of its surface.

Operative time: the operative time is the moment when the crests of the surface of the slice of bread overcome the temperature of 180°.

Therefore the problem can be identified and formulated in an objective manner without making judgments as formulations are free from adjectives and adverbs. The formulation is suitable for being processed and automatically converted into a query interrogating a knowledge database or for being used for defining the technical problem in the several systems operating according to the several automated solving methods for technical problems, for example the solving methods described hereinbefore.

The examples set forth above are provided to give those of ordinary skill in the art a complete disclosure and description of how to make and use the embodiments of the methods and systems for computer-aided identification of technical phenomena of the disclosure, and are not intended to limit the scope of what the inventors regard as their disclosure. Modifications of the above-described modes for carrying out the disclosure can be used by persons of skill in the art, and are intended to be within the scope of the following claims.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a", "an", and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications can be made without departing from the spirit and scope of the present disclosure. Accordingly, other embodiments are within the scope of the following claims.

What is claimed is:

1. A system for computer-aided identification of technical problems comprising a computer adapted to execute a program, the computer comprising:

an alphanumeric data input, a graphical information input, a visual display, and wherein:

the program, when executed, prompts the computer to display a sequence of windows which request input for a description of the technical problem, wherein:

the input can be alphanumeric, human natural language and/or a graphical image, identification of the technical problem may be determined according to specific logic and construction rules of the human natural language expression or the graphic expression, and formulation rules may change from window to window and are displayed at the margin of a data input field in the window, the program comprising formulation steps wherein the formulation steps are grouped together in three formulation stages comprising:

a first formulation stage for defining/formulating the technical problem at macro level with reference to an element affected by an undesired effect, a second formulation stage for formulating the technical problem at a more detailed micro level, that is on an enlarged scale still with reference to a micro element affected by or showing the undesired effect, and a third stage for defining the element generating the undesired effect on the element affected by it and an effect or an action that the undesired effect results from.

2. The system according to claim 1, wherein:

two first stages for formulating the technical problem are provided, the formulation rules may require the user to define a space-time arrangement of an element of a technical system affected by the undesired effect, and at least one further formulation stage is provided with formulation rules for generating chains of cause and effect for identifying a cause of the undesired effect.

3. The system according to claim 2, wherein the first formulation stage comprises:

i.) a first formulation step wherein the problem is expressed by indicating:

the element affected by the undesired effect, a type of undesired effect, and an operative zone, the operative zone being a zone of the element affected by the undesired effect, i.e. where the undesired effect takes place, wherein a linguistic expression is requested with a minimum of three to a maximum of 5 words, the linguistic expression not including adjectives or adverbs;

ii.) an extended formulation step wherein the identification/formulation of a moment when the undesired effect starts or ends is considered and an alternative formulation is achieved by exploring or speculating a mechanism, wherein a linguistic expression provides a specific maximum number of words which not including adverbs or adjectives and comprises the following elements:

the element affected by the undesired effect, the type of undesired effect, the operative zone, the operative time, the operative time being the moment when the undesired effect starts or ends in the operative zone;

iii.) at least a first alternative exploration step for the problem comprising identifying and formulating one or more technical problems to be solved before solving the main problem wherein the first alternative exploration step takes place in a time prior to the operative time and/or new technical problems resulting from the non-solution of the main technical problem and which new technical problems therefore take place in a time after the operative time defined for the main problem; and a step selecting the technical problem to be solved among various alternatives.

4. The system according to claim 1, wherein the second formulation stage comprises:

i.) a first formulation step where the problem formulation is at a more detailed level and wherein the problem is defined by:

the element determined in a first extended formulation;

a new undesired effect affecting the element at micro level;

an operative zone of the element at said micro level where the undesired effect takes place;

ii.) a second extended formulation step wherein the problem is defined by:

the element determined by the second formulation, the undesired effect of the second formulation affecting said element and at micro level, the operative zone wherein said undesired effect of the second formulation takes place, and the operative time of the second formulation that is related to the undesired effect of the second formulation and to the operative zone of the second formulation.

5. The system according to claim 1, wherein the third formulation stage provides steps formulating the technical problem from the perspective of the element generating the undesired effect on the element affected by it according to the identification thereof in the previous first and second stages and of an operative zone generating the undesired effect on the element affected by it.

6. The system according to claim 1 wherein the third formulation stage is carried out by generating cause and effect diagrams wherein the generating comprises manual or by computer-aided of generating.

7. The system according to claim 1, providing a problem formulation by means of natural language and/or graphics in a query and inputting the technical problem in a system for automated solution of problems or in a query interrogating a technical knowledge database.

8. The system according to claim 1, wherein there is provided at least an automatic routine analyzing the human natural language expression and/or the graphical expression and verifying the correspondence of at least some of the logical or construction rules of the human natural language expression or of the graphical expression.

9. The system according to claim 1, comprising a means for verifying that the input of alphanumeric and/or graphical data requested by a certain window is completed, wherein said means also controls storage of an image of the window, data inputted, and the display of the following window in the sequence of windows when a data input step is completed and/or when there is a correspondence of at least some of the logical or construction rules of the human natural language expression or of the graphical expression with which the alphanumeric and/or graphical data requested by said window have been described, while otherwise said certain window is still displayed.

10. The system according to claim 1, wherein one or more of the data request and input windows have at least an area for inputting alphanumeric data in the form of human natural language expression and at least an area for inputting data in the form of a graphical representation.

11. The system according to claim 1, wherein each window has an area displaying a sequence of windows, each one of said windows being identified by a functional name corresponding to a data input action requested thereby, and a field identifying the complete and/or proper execution of the operative step requested by said window being associated to each window.

12. A method for computer-aided identification of technical problems, the method comprising executing a computer program on a computer, the computer comprising:

an alphanumeric data input, a graphical information input, and a visual display;

wherein:

the executing the program prompts the computer to display a sequence of windows which request input for a description of the technical problem, wherein:

the input can be alphanumeric, human natural language and/or a graphical image, identification of the technical problem may be determined according to specific logic and construction rules of the human natural language expression or the graphic expression, formulation rules may change from window to window and are displayed at the margin of a data input field in the window, the method further comprising formulation steps, the formulation steps being grouped together in three formulation stages comprising:

a first formulation stage for defining/formulating the technical problem at macro level with reference to an element affected by an undesired effect, a second formulation stage for formulating the technical problem at a more detailed micro level, that is on an enlarged scale still with reference to a micro element affected by or showing the undesired effect, and a third stage for defining the element generating the undesired effect on the element affected by it and an effect or an action that the undesired effect results from.

* * * * *